United States Patent [19]
Sato

[11] Patent Number: 5,940,648
[45] Date of Patent: Aug. 17, 1999

[54] ELECTRO-DEVELOPING TYPE CAMERA USING ELECTRO-DEVELOPING RECORDING MEDIUM

[75] Inventor: Koichi Sato, Tokyo, Japan

[73] Assignee: Asahi Kogaku Kogyo Kabushiki Kaisha, Tokyo, Japan

[21] Appl. No.: 08/728,984

[22] Filed: Oct. 11, 1996

[30] Foreign Application Priority Data

Oct. 12, 1995 [JP] Japan .................................. 7-290372

[51] Int. Cl.⁶ .................................................. G03B 19/00
[52] U.S. Cl. ........................ 396/429; 396/285; 396/389
[58] Field of Search ........................... 396/30, 429, 273, 396/270, 284, 285, 389, 390, 392, 563; 348/231, 233; 356/443, 444

[56] References Cited

U.S. PATENT DOCUMENTS

| | | | |
|---|---|---|---|
| 4,666,306 | 5/1987 | Matsumoto | 356/404 |
| 4,878,075 | 10/1989 | Cannon | 354/173.1 |
| 4,887,161 | 12/1989 | Watanabe et al. | 358/224 |
| 4,956,713 | 9/1990 | Takanashi et al. | 358/209 |
| 5,315,410 | 5/1994 | Takanshi et al. | 358/471 |
| 5,408,341 | 4/1995 | Takanashi et al. . | |
| 5,416,560 | 5/1995 | Taka | 354/471 |
| 5,424,156 | 6/1995 | Aoki et al. . | |
| 5,424,772 | 6/1995 | Aoki et al. | 348/207 |
| 5,477,289 | 12/1995 | Smart | 354/106 |
| 5,555,205 | 9/1996 | Okabe | 365/108 |
| 5,649,252 | 7/1997 | Takahashi et al. | 396/389 |
| 5,671,455 | 9/1997 | Nagata et al. | 396/390 |

FOREIGN PATENT DOCUMENTS

| | | |
|---|---|---|
| 0327236 | 8/1989 | European Pat. Off. . |
| 229081 | 1/1990 | Japan . |
| 315087 | 1/1991 | Japan . |
| 3278342 | 12/1991 | Japan . |
| 5-2280 | 1/1993 | Japan . |
| 524706 | 4/1993 | Japan . |
| 5150251 | 6/1993 | Japan . |
| 5165005 | 6/1993 | Japan . |
| 6130347 | 5/1994 | Japan . |
| 0622954 | 11/1994 | Japan . |
| 6313894 | 11/1994 | Japan . |
| 7-13132 | 1/1995 | Japan . |

*Primary Examiner*—Safet Metjahic
*Assistant Examiner*—John Chizmar
*Attorney, Agent, or Firm*—Greemblum & Bernstein P.L.C.

[57] ABSTRACT

An electro-developing type camera uses an electro-developing recording medium, and has a determiner for determining whether the electro-developing recording medium has been recorded on or not when being loaded in the camera, and a selector for selecting one of a photographing mode and an image-reading mode as an operation mode of the camera. A photographing operation is executed in the photographing mode to record and develop an optical image in the electro-developing recording medium. An image-reading operation is executed in the image-reading mode to read the developed image of the electro-developing recording medium. The photographing mode is selected by the selector when the determiner determines that the electro-developing recording medium has not been recorded, and the image-reading mode is selected by the selector when the determiner determines that the electro-developing recording medium has been recorded.

21 Claims, 15 Drawing Sheets

ELECTRO-DEVELOPING TYPE CAMERA USING ELECTRO-DEVELOPING RECORDING MEDIUM

BACKGROUND OF THE INVENTION

1. Field of the Invention

The present invention relates to an electro-developing type video camera using an electro-developing recording medium in which an optical image obtained through a photographing lens system is electronically and directly recorded and developed as a visible image in very little time, and more particularly to relates to such an electro-developing type video camera constituted such that a developed image of the electro-developing recording medium can be optically and electronically read.

2. Description of the Related Art

Such an electro-developing recording medium per se is known. For example, Japanese Unexamined Patent Publication No. 5-2280 and U.S. Pat. No. 5,424,156 disclose one type of electro-developing recording medium comprising an electrostatic information recording medium and an electric charge keeping medium. The electrostatic information recording medium includes a photoconducting layer and an inorganic oxide material layer, and the electric charge keeping medium includes a liquid crystal display, both mediums being combined to face each other with a small gap therebetween.

An electronic still video camera using the electro-developing recording medium has already been proposed, and is referred to as an electro-developing type camera hereinafter.

In a photographing operation of the electro-developing type camera, a voltage is applied to the electro-developing recording medium, and an optical image is formed on a light receiving surface of the electrostatic information recording medium by a photographing optical system. An electric charge is distributed over the electrostatic information recording medium in accordance with a light intensity distribution of the optical image formed on the light receiving surface thereof, so that the intensity of an electric field, acting on the liquid crystal of the electric charge keeping medium, is in accordance with the electric charge distribution.

Thus, the optical image is reproduced in the electric charge keeping medium as a visible image. Namely, as soon as the optical image is formed on the electrostatic information recording medium, the optical image is recorded and developed in the electric charge keeping medium.

When the electric charge keeping medium is constituted as a memory-type liquid crystal display using, for example, a smectic liquid crystal, the developed visible image can be kept therein even if the electric field is eliminated from the electro-developing recording medium. In this case, the electro-developing recording medium carrying the developed visible image can be preserved in the same way as slides or transparency sheet films.

Also, in the memory type liquid crystal display, the developed image can be erased by heating the display to a given temperature. In this case, the same electro-developing recording medium can be repeatedly used for photographing.

Under these circumstances, the electro-developing recording medium carrying the developed visible image may be mistaken for a blank recording medium, and erroneously loaded into a camera. If the loaded medium is subjected to a second exposure, the first developed visible image is lost from the medium, and the newly-photographed image cannot be properly recorded and developed thereon.

Further, a developed recording medium is not usually unloaded from the camera immediately after photographing. Thus, the developed recording medium is frequently subjected to a double exposure, resulting in the problem mentioned above.

SUMMARY OF THE INVENTION

Therefore, an object of the present invention is to provide an electro-developing type camera using an electro-developing recording medium, which is constituted such that not only can a double exposure be prevented given, but also a manipulation of the camera can be improved with respect to the prevention of the double exposure.

In accordance with the present invention, there is provided an electro-developing type camera using an electro-developing recording medium, comprising: a determiner for determining whether the electro-developing recording medium has been recorded on or not when being loaded in the camera; and a selector for selecting one of a photographing mode and an image-reading mode as an operation mode of the camera, a photographing operation being executed in the photographing mode to record and develop an optical image in the electro-developing recording medium, an image-reading operation being executed in the image-reading mode to read the developed image of the electro-developing recording medium, wherein the photographing mode is selected by the selector when the determiner determines that the electro-developing recording medium has not been recorded, and the image-reading mode is selected by the selector when the determiner determines that the electro-developing recording medium has been recorded.

Preferably, the electro-developing type camera further comprises a displayer for displaying a message indicating the photographing mode when the determiner determines that the electro-developing recording medium has not been recorded, and for displaying an message indicating the image-reading mode when the determiner determines the electro-developing recording medium has been recorded. The message displayer may comprise a liquid crystal displayer provided on a camera body of the camera.

According to the present invention, the electro-developing recording medium includes an electrostatic information recording medium and an electric charge keeping medium.

The determiner may comprise a transparency sensor for detecting dark-zone-transparency data at a portion of the electric charge keeping medium corresponding to a dark zone defined on a light receiving surface of the electrostatic information recording medium. A comparator compares the dark-zone-transparency data with reference-transparency data. In this case, it is determined that the electro-developing recording medium has not been recorded on when the comparator determines that the dark-zone-transparency data is substantially equal to the reference-transparency data, and it is determined that the electro-developing recording medium has been recorded on when the comparator determines that the dark-zone-transparency data is out of the reference-transparency data.

Also, the determiner may comprise a first transparency sensor for detecting dark-zone-transparency data at a portion of the electric charge keeping medium corresponding to a dark zone defined on a light receiving surface of the electrostatic information recording medium. A second transparency sensor detects reference-transparency data at a non-electric field portion of the electric charge keeping medium. A comparator compares the dark-zone-transparency data with the reference-transparency data. In this case, it is determined that the electro-developing recording medium has not been recorded on when the comparator determines that the dark-zone-transparency data is substantially equal to the reference-transparency data, and it is determined that the electro-developing recording medium has been recorded on when the comparator determines that the dark-zone-transparency data is out of the reference-transparency data.

The comparator may comprise a calculator for calculating comparison data between the dark-zone-transparency data and the reference-transparency data, and the comparator determines whether or not the comparison data falls within a given permissible range.

Further, the determiner may comprise a transparency sensor for detecting dark-zone-transparency data at a portion of the electric charge keeping medium corresponding to a dark zone defined on a light receiving surface of the electrostatic information recording medium. An electronic control circuit includes a memory for storing a comparator program for comparing the dark-zone-transparency data with reference-transparency data. In this case, it is determined that the electro-developing recording medium has not been recorded on when the comparator program determines that the dark-zone-transparency data is substantially equal to the reference-transparency data, and it is determined that the electro-developing recording medium has been recorded on when the comparator program determines that the dark-zone-transparency data is out of the reference-transparency data.

Furthermore, the determiner may comprise a first transparency sensor for detecting dark-zone-transparency data at a portion of the electric charge keeping medium corresponding to a dark zone defined on a light receiving surface of the electrostatic information recording medium. A second transparency sensor detects reference-transparency data at a non-electric field portion of the electric charge keeping medium. An electronic control circuit includes a memory for storing a comparator program for comparing the dark-zone-transparency data with reference-transparency data. In this case, it is determined that the electro-developing recording medium has not been recorded on when the comparator program determines that the dark-zone-transparency data is substantially equal to the reference-transparency data, and it is determined that the electro-developing recording medium has been recorded on when the comparator program determines that the dark-zone-transparency data is out of the reference-transparency data.

The comparator program comprises a calculator program for calculating comparison data between the dark-zone-transparency data and the reference-transparency data, and the comparator program determines whether or not the comparison data falls within a given permissible range.

Furthermore, the determiner may comprise a transparency sensor for detecting transparency data of a detective through-zone defined in the electro-developing recording medium. A comparator compares the transparency data with threshold-transparency data. In this case, it is determined that the electro-developing recording medium has not been recorded on when the comparator determines that the transparency data is smaller than the threshold-transparency data, and it is determined that the electro-developing recording medium has been recorded on when the comparator determines that the transparency data is larger than the threshold-transparency data.

Furthermore, the determiner may comprise a transparency sensor for detecting transparency data of a detective through-zone defined in the electro-developing recording medium. An electronic control circuit includes a memory for storing a comparator program for comparing the transparency data with threshold-transparency data. It is determined that the electro-developing recording medium has not been recorded on when the comparator program determines that the transparency data is smaller than the threshold-transparency data, it is determined that the electro-developing recording medium has been recorded on when the comparator program determines that the transparency data is larger than the threshold-transparency data.

BRIEF DESCRIPTION OF THE DRAWINGS

These objects and other objects of the present invention will be better understood from the following description, with reference to the accompanying drawings in which.

DESCRIPTION OF THE PREFERRED EMBODIMENTS

Figure 1:
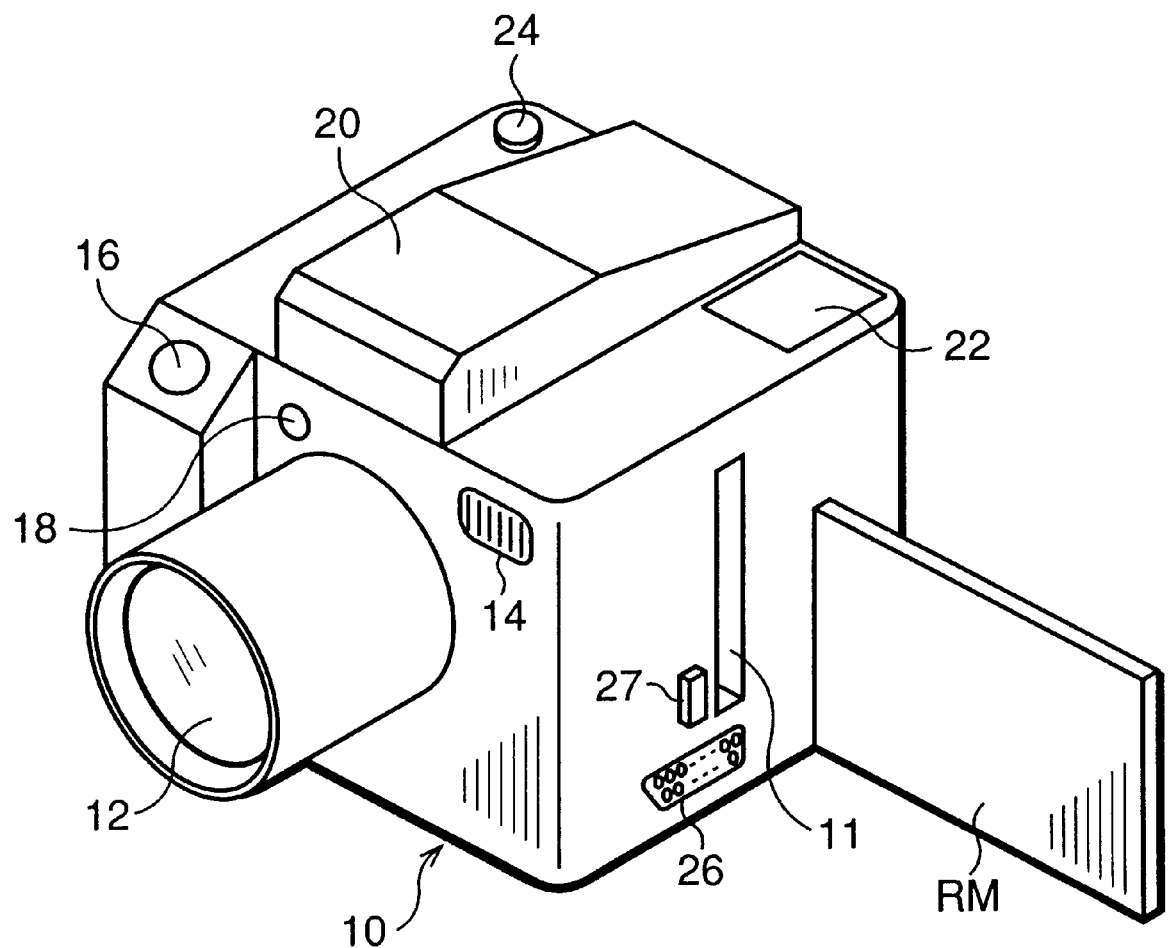
FIG. 1 is a schematic perspective view showing an appearance of a first embodiment of an electro-developing type camera using an electro-developing recording medium according to the present invention.

FIG. 1 is an external view of an electro-developing type camera constituted as an electronic still video camera in accordance with the present invention. The camera comprises a camera body 10 having an elongated slot 11 formed in a side wall thereof, and an electro-developing recording medium RM is loaded and unloaded in the camera through the elongated slot 11.

When viewing the camera body 10 from a front side thereof, a photographing optical system 12 is provided at an approximately central location on front surface of the camera body 10, and an electronic flash 14 is disposed on the front surface of the camera body 10 above and to the right side of and above the photographing optical system 12. A release switch 16 and a photometry sensor 18 are provided on the front, on the opposite side of the photographing optical system 12 relative to the electronic flash 14.

A viewfinder 20 is provided centrally on the top surface of the camera body 10. An LCD (liquid crystal display) panel 22 is provided on the top surface, to one side of the viewfinder 20, and a main switch 24 is provided on the other side of the viewfinder 20. Further, an output terminal connector 26 is provided in the side wall of the camera in which the elongated slot 11 is formed, so that an image signal obtained by the camera can be outputted to an external recording device.

Note, in FIG. 1, reference numeral 27 indicates a button for ejecting and unloading the electro-developing recording medium from the camera through the elongated slot 11.

Figure 2:
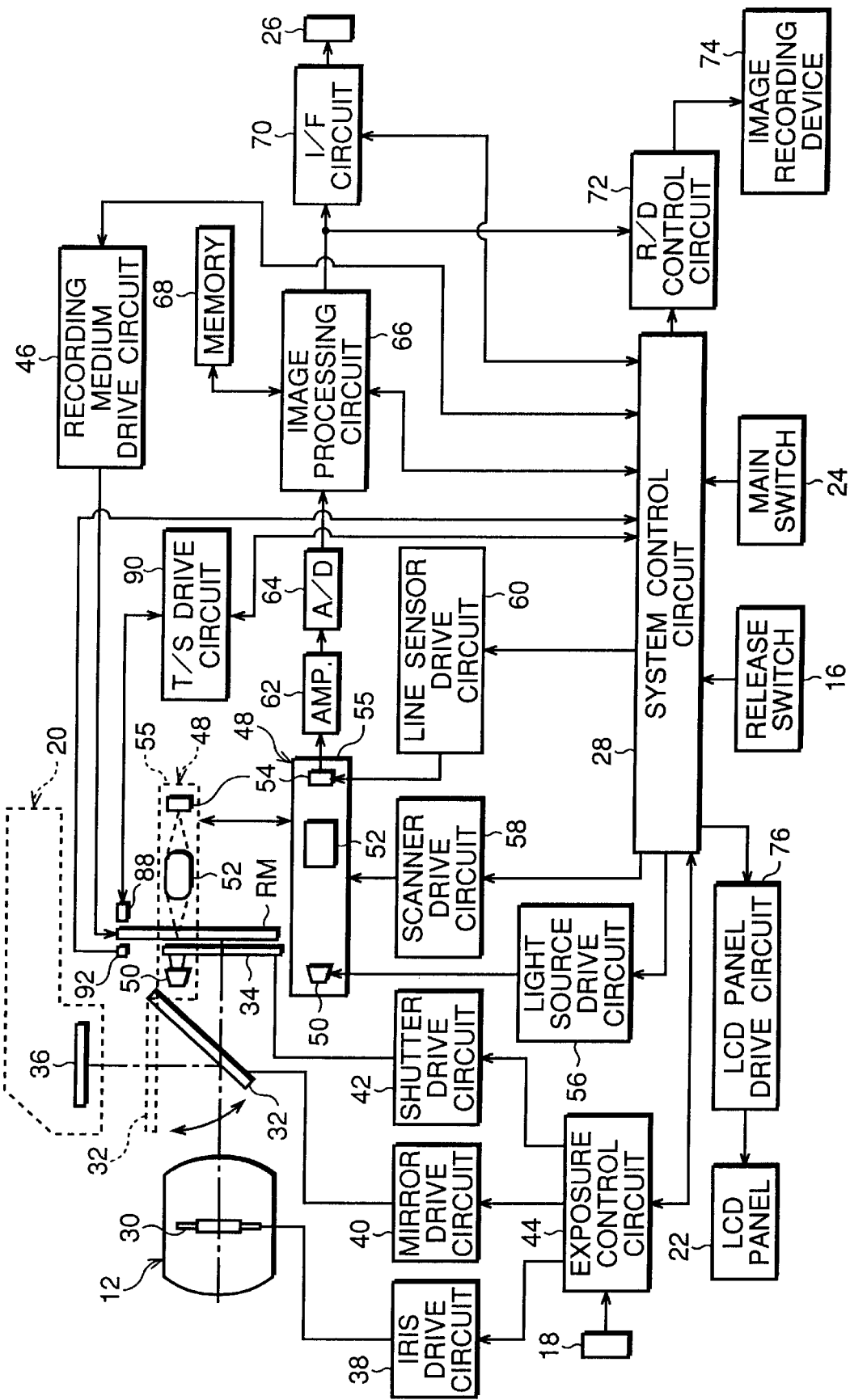
FIG. 2 is a block diagram of the first embodiment of the electro-developing type camera according to the present invention.

FIG. 2 shows a block diagram of a first embodiment of the electro-developing type camera according to the present invention. A system control circuit 28, which includes a microcomputer or microprocessor, a read-only memory (ROM), and a random-access-memory (RAM), etc., is provided to control the electro-developing type camera as a whole.

The photographing optical system 12 has a plurality of lens groups and an aperture or diaphragm 30, and the electro-developing recording medium RM loaded through the elongated slot 11 is disposed behind the photographing optical system 12. A quick return mirror 32 is placed between the photographing optical system 12 and the electro-developing recording medium RM, and a shutter 34 is provided between the quick return mirror 32 and the electro-developing recording medium RM. A focusing glass 36 included in a viewfinder optical system of the viewfinder 20 is disposed above the quick return mirror 32.

The diaphragm 30, the quick return mirror 32 and the shutter 34 are driven by an iris drive circuit 38, a mirror drive circuit 40, and a shutter drive circuit 42, respectively, and these drive circuits 38, 40, and 42 are controlled by an exposure control circuit 44 which is operated in accordance with a command signal outputted by the system control circuit 28.

During an exposure, the size of the diaphragm 30 is adjusted by the iris drive circuit 38 under control of the exposure control circuit 44 based on an output signal of the photometry sensor 18.

The quick return mirror 32 is usually in a down-position (the inclined position shown by the solid lines in FIG. 2), and thus light beams passing through the photographing optical system 12 are directed to the optical system of the viewfinder 20, so that an object to be photographed can be observed through the viewfinder 20 by a photographer. When a photographing operation is executed, the quick return mirror 32 is rotated upward by the mirror drive circuit 40, and is then in an up-position (the horizontal position shown by the broken lines in FIG. 2), so that the light beams are directed to the shutter 34.

The shutter 34 is usually closed, however, when taking a photograph, the shutter 34 is opened over a given period of time by the shutter drive circuit 42 under control of the exposure control circuit 44. Thus, during the photographing operation, the light beams, passing through the photographing optical system 12 and the shutter 34, are directed to a light receiving surface of the electro-developing recording medium RM. Namely, by rotating the quick return mirror 42 from the down position to the up-position, and by opening the shutter 34, an optical image to be photographed by the photographing optical system 12 is focussed and formed on the light receiving surface of the electro-developing recording medium RM.

A voltage is applied to the electro-developing recording medium RM under control of a recording medium drive circuit 46 which is operated in accordance with a command signal outputted by the system control circuit 28. By exposing the electro-developing recording medium RM while applying the voltage, the optical image obtained by the photographing optical system 12 is developed in the electro-developing recording medium RM as a visible image.

An image reader or scanning mechanism 48 is provided in the camera body 10 in the vicinity of the electro-developing recording medium RM loaded therein, and executes a scanning operation for electronically reading the developed image of the electro-developing recording medium RM. The scanning mechanism 48 comprises a linear light source 50, a scanner optical system 52, and a line image-sensor 54 which are supported by a carriage member 55, all of which are aligned with each other.

The linear light source 50 is positioned at the front side of the shutter 34 and the electro-developing recording medium RM, and includes an LED (light emitting diode) array having a plurality of light emitting diodes aligned with each other, and a collimating lens for converting the light rays emitted therefrom, into parallel light rays. These elements are arranged so as to form a linear light emitting surface.

The scanner optical system 52 and the line image-sensor 54 are positioned behind the electro-developing recording medium RM. The line image-sensor 54 is constructed as a one-dimensional CCD sensor having for example 2,000 pixel elements which form a linear light receiving surface. The parallel light rays emitted from the linear light source 50 are focussed on the linear light receiving surface of the line image-sensor 54 by the scanner optical system 52.

The carriage member 55, by which the linear light source 50, the scanner optical system 52, and the line image-sensor 54 are supported, is movable between a lower position shown by a solid line in FIG. 2 and an upper position shown by a broken line in FIG. 2, and a movement of the carriage member 55 is carried out by a drive motor (not shown) such as a stepping motor, a servo motor, or the like.

When the scanning operation or reading operation of the developed image from the electro-developing recording medium RM is executed, the shutter 34 is opened, and the linear light source 50 is turned ON. Then, the carriage member 55, which supports the scanning mechanism 48, is moved from the lower position (solid lines) to a scan start position, and is further moved intermittently from the scan start position toward the upper position (broken lines). Thus, the electro-developing recording medium RM is scanned with the light rays emitted from the linear light source 50 during the intermittent movement of the scanning mechanism 48.

During the scanning operation, the light rays passing through the electro-developing recording medium RM, i.e., the light rays carrying image information of the developed image thereof are focussed on the light receiving surface of the line image-sensor 54 by the scanner optical system 52. The line image-sensor 54 serves as a photoelectric-conversion device for sensing and converting the optical image information into electrical image pixel signals. Of course, the light source 50 and the line image-sensor 54 are of suitable length to completely cover and extended over a width of a recording area of the electro-developing recording medium RM. The electrical image pixel signals are read out from the line image-sensor 54 during a movement of the scanning mechanism 48 between the two adjacent scanning steps.

ON and OFF control of the light source 50 is performed by a light source drive circuit 56. The intermittent movement of the scanning mechanism 48 is carried out by driving the drive motor for the carriage member 55 under control of a scanner drive circuit 58. The reading-scan of the image pixel signals from the line image-sensor 54 is controlled by a line sensor drive circuit 60. These derive circuits 56, 58, and 60 are controlled by the system control circuit 28.

The image pixel signals read-out from the line image-sensor 54 are amplified by an amplifier 62, and are then converted to digital pixel signals by an analog-to-digital (A/D) converter 64. The digital pixel signals are subjected to a shading correction, a gamma correction, and so on by an image processing circuit 66 under control of the system control circuit 28, and are then temporarily stored in a memory 68 which may include an EEPROM having correction data for the shading correction. Note, the memory 68 may have a capacity for storing a single-frame of digital pixel signals obtained by a completion of the scanning operation of the scanning mechanism 48.

The pixel signals outputted from the memory 68 may be optionally inputted into an interface circuit 70 through the image processing circuit 66. In this case, the pixel signals are subjected to a given process such as a format-conversion process and so on, and are then transferred from the interface circuit 70 to, for example, an external monitor device (not shown) through the output terminal connector 17.

Also, the pixel signals outputted from the image process circuit 66 may be recorded on, for example, a second recording medium, such as an IC memory card, a floppy disk, a detachable hard disk, or the like, in an image recording device 74 therefor. The pixel signals read out of the second recording medium may be transferred to an external processing device such as a personal computer, if necessary. In this case, the pixel signals are subjected to a given process such as an image-compression processing, a format-conversion processing in a recording device control circuit 72, and so on.

The interface circuit 70 and the recording device control circuit 72 are operated in accordance with command signals outputted from the system control circuit 28.

The release switch 16 is connected to the system control circuit 28, and is, of course, used to make the photographing operation to execute. Namely, the execution of the photographing operation is carried out by turning the release switch ON. Nevertheless, the release switch 16 is also used to make the scanning operation to execute when the electro-developing recording medium RM loaded in the camera has been recorded on, as discussed hereinafter in detail.

The LCD panel 22 is connected to the system control circuit 28 through a liquid crystal drive circuit 76 to display various setting conditions of the electro-developing type camera, suitable massages, and so on. Further, the main switch 24 is connected to the system control circuit 28 to control ON and OFF settings of a main power source (not shown).

Figure 3:
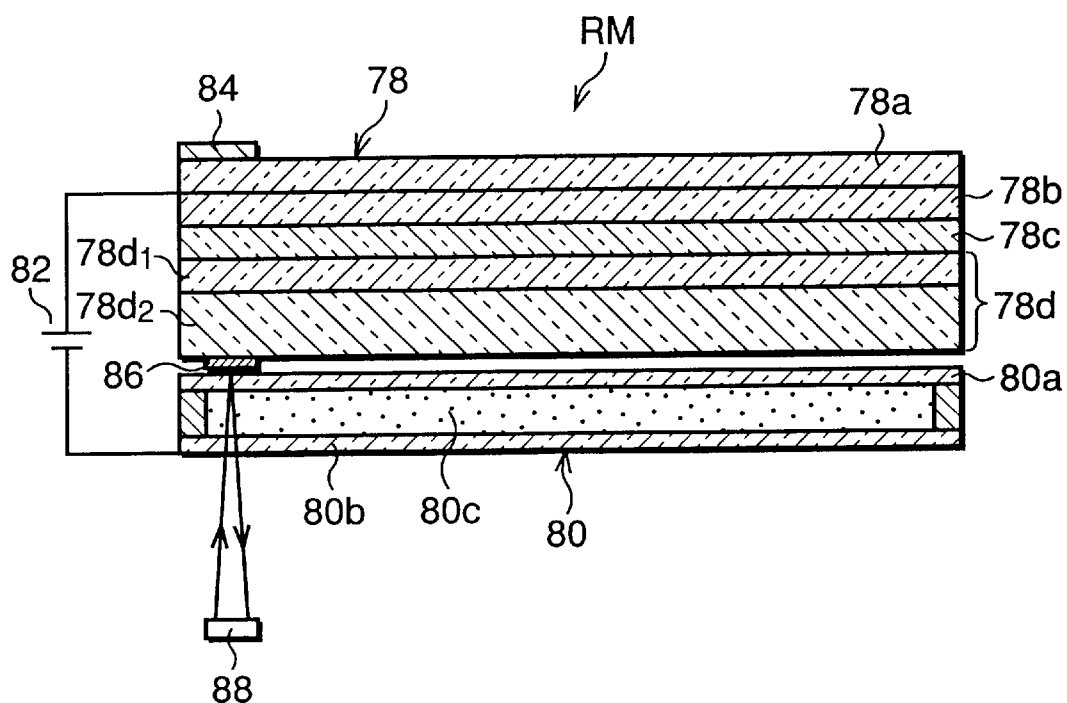
FIG. 3 is a cross sectional view showing a structure of the electro-developing recording medium used in the first embodiment of the electro-developing type camera according to the present invention.

FIG. 3 shows a structure of the electro-developing recording medium RM used in the electro-developing type camera according to the present invention, and the electro-developing recording medium RM comprises an electrostatic information recording medium 78 and an electric charge keeping medium 80, and a voltage is applied therebetween by an electric power source 82, illustrated symbolically in FIG. 3. Note, the electric power source 82 forms a part of the recording medium drive circuit 46, and a recording medium activating signal (a voltage signal) is applied from the recording medium drive circuit 46 to the electro-developing recording medium RM during the photographing operation.

The electrostatic information recording medium 78 is formed by laminating a base plate 78a, an electrode layer 78b, an inorganic oxide material layer 78c and a photoconducting layer 78d. The photoconducting layer 78d is formed by laminating an electric charge generating layer $78d_1$ and an electric charge transferring layer $78d_2$.

The electric charge keeping medium 80 comprises a liquid crystal display which includes a liquid crystal supporting plate 80a, a liquid crystal electrode layer 80b, and a liquid crystal 80c intervened therebetween. Namely, the liquid crystal 80c is confined as a film-like layer between the supporting plate 80a and the electrode layer 80b.

In the example of the electro-developing recording medium RM shown in FIG. 3, the electric charge transferring layer $78d_2$ of the photoconducting layer 78d and the liquid crystal supporting plate 80a of the electric charge keeping medium 80 face each other with a small gap therebetween. Note, as is apparent from FIG. 3, the whole structure of the electrostatic information recording medium 78 is transparent.

When the electric power source 82 is turned ON, or when the recording medium drive circuit 46 is energized, the voltage signal or recording medium activating signal is applied between the electrostatic information recording medium 78 and the electric charge keeping medium 80, i.e., between the electrode layer 78b and the liquid crystal electrode layer 80b.

When an optical image is formed on the electrostatic information recording medium 78 by the photographing optical system 12 during the application of the voltage signal thereto, an electric charge distribution is produced over the electrostatic information recording medium 78 in accordance with a light intensity distribution of the optical image formed thereon, so that the intensity of an electric field, acting on the liquid crystal 80c of the electric charge keeping medium 80, is in accordance with the electric charge distribution.

Thus, the optical image obtained from the photographing optical system 12 is reproduced in the liquid crystal 80c as a visible image. Namely, as soon as the optical image is formed on the electrostatic information recording medium 78, the image is developed in the electric charge keeping medium 80.

As is already stated hereinbefore, when the liquid crystal 80c is of a memory-type, such as a smectic liquid crystal, the developed image can be kept in the electro-developing recording medium RM even if the electric field is eliminated therefrom.

Of course, a contrast adjustment should be properly carried out such that the developed image can be obtained with an optimum contrast. In the electro-developing recording medium RM as mentioned above, the contrast control relates closely to a time during which a voltage is applied to the electro-developing recording medium RM, as discussed below.

Figure 4:
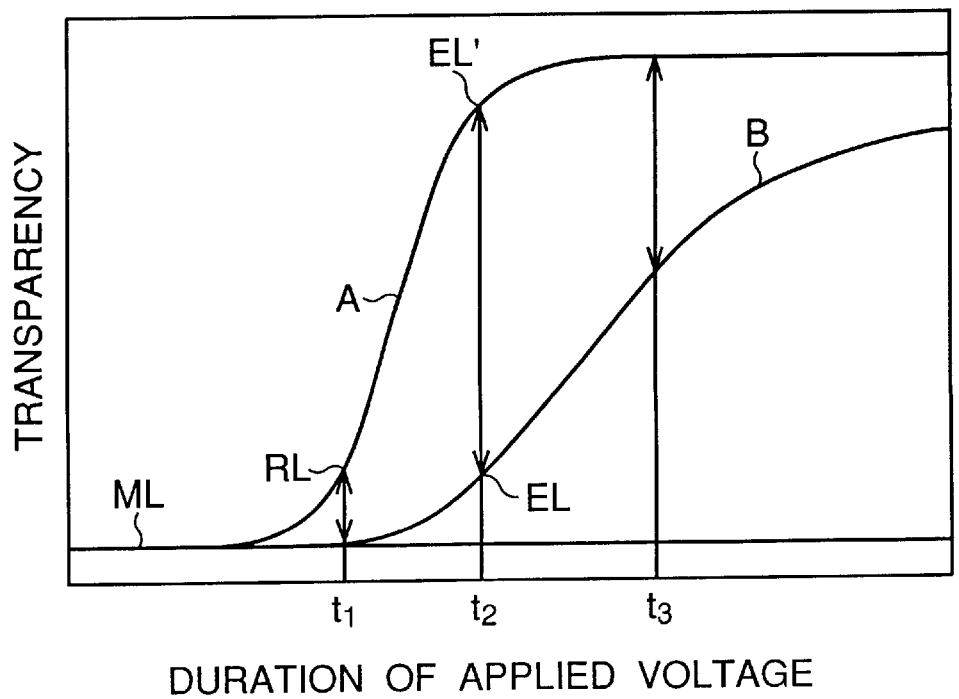
FIG. 4 is a graph showing characteristic curves of transparencies at light and dark zone images of an electric charge keeping medium of the electro-developing recording medium shown in FIG. 3, respectively.

For example, while a chart image, having white zones and black zones, is formed on the electrostatic information recording medium 78 of the electro-developing recording medium RM, and while each of the white zones and each of the black zones are developed as a light area of the image and a dark area of the image in the electric charge keeping medium or liquid crystal display 80 thereof, respectively, the transparencies of the light area of the image and the dark area of the image vary in accordance with a duration of the applied voltage to the electro-developing recording medium RM, as shown in a graph of FIG. 4.

Namely, in this graph, a characteristic curve A represents a change of the transparency of the light area of an image, and a characteristic curve B represents a change of the transparency of the dark area of an image. As is apparent from the graph, the characteristic curve A abruptly rises, whereas the characteristic curve B gradually rises, because an electrical resistance of a local portion of the electrostatic information recording medium 78 corresponding to the dark area of an image is not infinite so that an electrical current can flow in that local portion to thereby cause an gradual increase in transparency at the dark are of an image.

In short, an amount of electrical current flowing in the local portion of the medium 78 corresponding to the light area of an image is larger than that flowing in the other local portion of the medium 78 corresponding to the dark area of an image, so that the voltage applied to the light area of an image rises more rapidly in comparison with that to the dark area of an image. Thus, as shown in the graph of FIG. 4, the change of the transparency of the light area of an image (curve A) is more abrupt than that of the transparency of the dark area of an image (curve B).

A difference between the transparencies of the light and dark areas of an image represents a contrast of the image developed in the liquid crystal display 80 of the electro-developing recording medium RM. As is apparent from the graph of FIG. 4, the application of voltage to the electro-developing recording medium RM should be stopped at a time of $t_2$ so that the image can be developed with a maximum or optimum contrast. If the application of voltage to the electro-developing medium RM is prematurely stopped at a time of $t_1$, for example, a contrast of the developed image is very small compared to $t_2$. On the other hand, when the application of voltage to the electro-developing recording medium RM is stopped too late, as indicated by $t_3$, a contrast of the developed image is also smaller than at $t_2$.

Of course, a duration of the applied voltage from the recording medium drive circuit 46 to the electro-developing recording medium RM is controlled such that an optical image obtained from the photographing optical system 12 can be developed in the electro-developing recording medium RM with maximum or optimum contrast.

As is apparent from the foregoing, once the development of the image in the liquid crystal display 80 of the electro-developing recording medium RM is carried out, a transparency of a dark area of the developed image must rise from a minimum level to a given level, as in the case shown in the graph of FIG. 4 in which the characteristic curve B raises from the minimum level "ML" to a level "EL". The present invention utilizes this phenomenon to determine whether the electro-developing recording medium RM has been recorded on.

To this end, according to the present invention, as shown in FIG. 3, a light-blocking element 84 is adhered to a part of a margin area of the light receiving surface of the electrostatic information recording medium 78 such that the part is defined as a dark zone, and a light-reflecting element 86 is adhered to a surface of the photoconducting layer 78d so as to be aligned with the dark zone formed by the light-blocking element 84.

The light-blocking element 84 may comprise a piece of suitable metal foil such as aluminum foil, a suitable opaque coating, or the like. Also, the light-reflecting element 86 may comprise a piece of suitable metal foil such as aluminum foil, a suitable coating exhibiting reflectivity, or the like.

On the other hand, as shown in FIG. 2, the camera is provided with a transparency sensor 88 incorporated in the camera body 10 thereof in order to detect a transparency of a portion of the liquid crystal display 80 corresponding to the dark zone formed by the light-blocking element 84. As shown in FIG. 3, the transparency sensor 88 is arranged so as to be aligned with the light-reflecting element 86 when the electro-developing recording medium RM is loaded into the camera body 10.

The transparency sensor 88 includes a light emitting device (LED) and a light receiving device associated with each other, and is arranged such that a light beam emitted from the light emitting device is reflected by the light-reflecting element 88, and is then received by the light receiving device. Thus, an output signal obtained from the light receiving device of the transparency sensor 88 carries transparency information of the liquid crystal display 80 at the dark zone formed by the light-blocking element 84.

As shown in FIG. 2, the transparency sensor 88 is connected to the system control circuit 28 through a transparency sensor drive circuit 90 which is operated in accordance with a command signal outputted from the system control circuit 28. Also, the output signal outputted from the light receiving device of the transparency sensor 88 is fed to the system control circuit 28 through the transparency sensor drive circuit 90.

Also, as shown in FIG. 2, a recording medium detection sensor 92 is connected to the system control circuit 28, and is provided in the slot 11 of the camera body 10 at a suitable position to detect a loading of the electro-developing recording medium RM thereinto. The detection sensor 92 may be constructed as a contact switch. When the recording medium RM is loaded in the camera body 10, the detection sensor or contact switch 92 is turned ON. While the recording medium RM is unloaded in the camera body 10, the contact switch 92 is turned OFF. This ON/OFF signal is outputted from the contact switch 92 to system control circuit 28.

Of course, another type of detection sensor 92 may be used to detect the loading of the electro-developing recording medium RM of the camera body 10. For example, the detection sensor 92 may comprise an optical sensor, a magnet sensor or the like.

Figure 5:
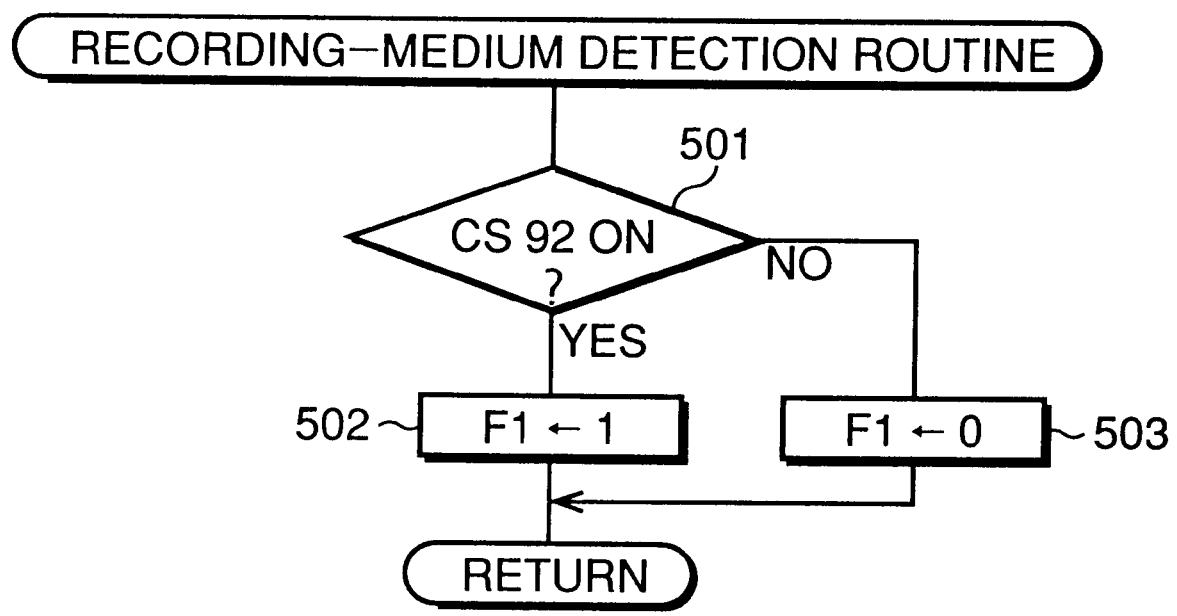
FIG. 5 is a flow chart showing a routine for detecting a loading of the electro-developing recording medium in the electro-developing type camera according to the present invention.

FIG. 5 shows a flow chart for explaining a routine for detecting whether the electro-developing recording medium RM has been loaded in the camera body 10 through the slot 11 thereof. This routine is a time interruption routine executed at regular intervals of, for example, 10 μm, and the execution of the routine is started by turning the main switch or power switch 24 ON.

At step 501, it is determined whether the detection sensor or contact switch (CS) 92 has been turned ON so that the ON-signal is outputted from the contact switch 92 to the system control circuit 28.

When the ON-signal has been outputted from the contact switch 92 to the system control circuit 28, i.e., when the loading of the electro-developing recording medium RM into the camera body 10 has been detected by the contact switch 92, the control proceeds from step 501 to step 502, in which a flag F1 is set to "1".

On the other hand, when the output of the ON-signal from the contact switch 92 to the system control circuit 28 has been stopped, i.e., when the unloading of the electro-developing recording medium RM from the camera body 10 is detected by the contact switch 92, the control proceeds from step 501 to step 502, in which the flag F1 is set to "0".

Namely, the routine shown by the flow chart of FIG. 5 monitors the loading of the electro-developing recording medium RM into the camera body 10 at the regular intervals of 10 μm.

Figure 6:
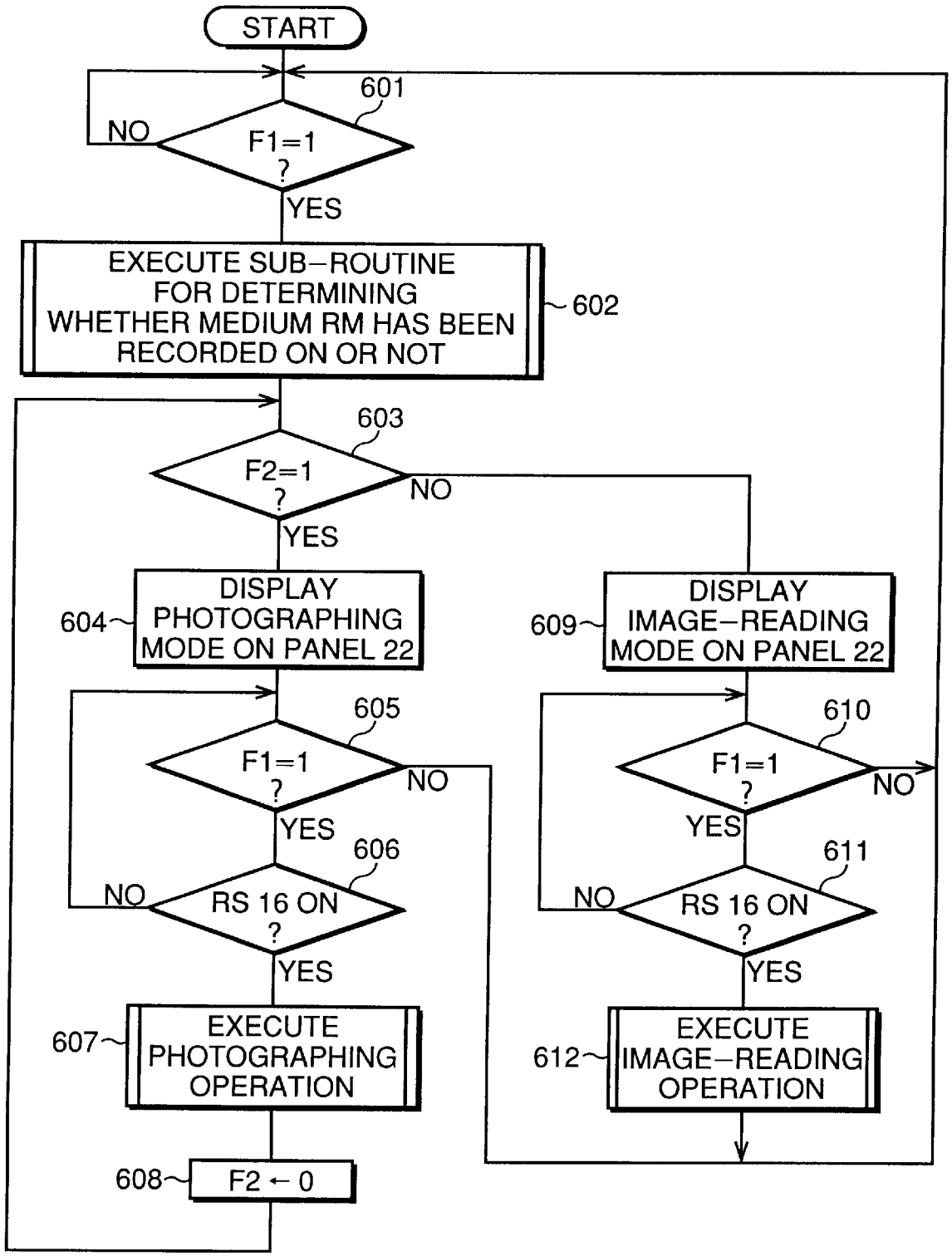
FIG. 6 is a flow chart showing a main routine for an operation of the electro-developing type camera according to the present invention.

FIG. 6 shows a flow chart for explaining a main routine for operating the camera as mentioned above, and this routine is also executed by turning the power switch ON.

At step 601, it is determined whether the flag F1 is "1" or "0". As long as F1=0, i.e., as long as the electro-developing recording medium RM has been not loaded in the camera body 10, the routine stays at step 601, i.e., there is no progress of the routine.

At step 601, if F1=1, i.e., if the loading of the electro-developing recording medium RM has been confirmed, and control proceeds to step 602, in which a sub-routine for determining whether the loaded recording medium RM has been recorded on is executed. Note, this sub-routine is explained hereinafter in detail with reference to a flow chart of FIG. 7.

In short, if it has been confirmed that the loaded recording medium RM is not recorded on, a flag F2 is set to "1". On the other hand, if it has been confirmed that the loaded recording medium RM is recorded on, the flag F2 is kept to an initial setting of "0".

Figure 7:
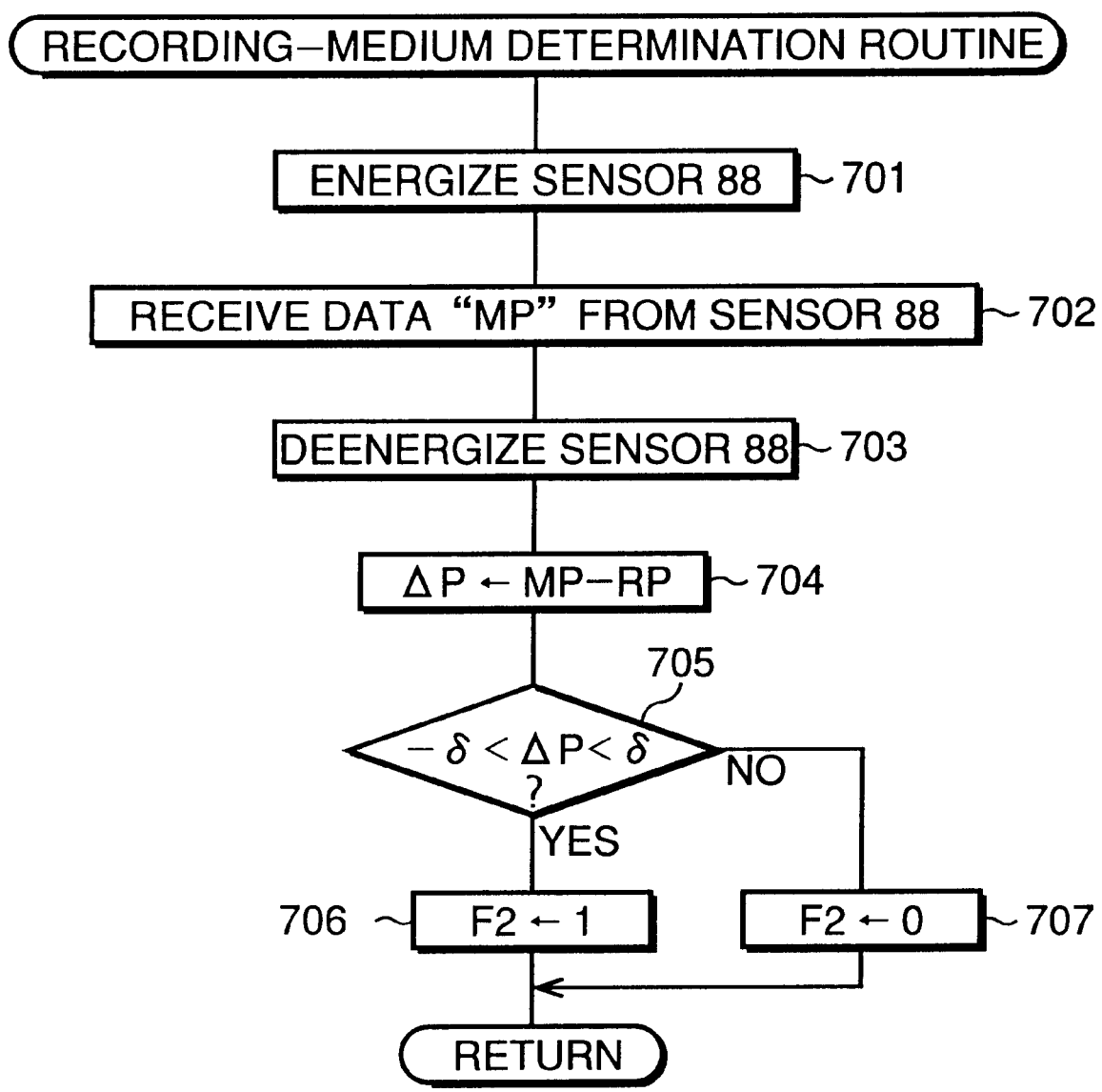
FIG. 7 is a flow chart showing a recording-medium determination routine for determining whether the electro-developing recording medium has been recorded on or not when being loaded in the electro-developing type camera according to the present invention.

After the execution of the sub-routine of FIG. 7 is completed, control returns from the sub-routine to step 603 of the main routine, in which it is determined whether flag F2 is "1" or "0". If F2=1, i.e., if the loaded recording medium RM is not recorded on, control proceeds from step 603 to step 604, in which the liquid crystal display panel 22 displays a massage announcing that the camera is set in a photographing mode in which a photographing operation is executed by turning the release switch 16 ON.

At step 605, it is determined whether the flag F1 is "1", i.e., it is determined whether the electro-developing recording medium RM is loaded in the camera body 10. Then, at step 606, it is determined whether the release switch 16 is turned ON. If the turn-ON of the release switch 16 is not carried out, the control returns to step 605. Namely, the routine including steps 605 and 606 is repeated until the release switch 16 is turned ON.

Steps 605 and 606 provide against a case where the loaded recording medium RM concerned is discharged from the camera body 10 by depressing the ejector button 27 before the turn-ON of the release switch 16 is carried out for some reason. For example, in the case where a blank recording medium RM is mistaken for a developed recording medium RM, and is erroneously loaded in the camera for an image-reading operation, such a blank recording medium RM might be discharged from the camera body 10 due to the message of the liquid crystal display panel 22 which announces that the camera is set in the photographing mode.

Accordingly, during the repetition of the routine including steps 605 and 606, if the loaded recording medium RM is discharged from the camera body 10 by the depression of the ejector button 27, the control returns from step 605 to step 601. Then, the camera stands ready for a further loading of the recording medium RM.

Of courses, during the repetition of the routine including steps 605 and 606, if the release switch 16 is turned ON, control proceeds from step 606 to 607, in which the photographing operation is executed. Note, the photographing operation will be explained in detail with reference to FIGS. 8 and 9.

After the photographing operation is completed, control proceeds to step 608, in which flag F2 is set to "0" because the loaded recording medium RM has been yet recorded on due to the completion of the photographing operation. Then, control returns from step 608 to step 603.

When it has been confirmed at step 602 that the loaded recording medium RM is recorded on by the execution of the sub-routine of FIG. 7, or when control has returned from step 608 to step 603 after the completion of the photographing operation, flag F2=0. In this case, control proceeds from step 603 to step 609, in which the liquid crystal display panel 22 displays a massage announcing that the camera is set in an image-reading mode in which an image reading operation is executed by turning the release switch 16 ON.

At step 610, it is determined whether flag F1 is "1", i.e., it is determined whether the electro-developing recording medium RM is loaded in the camera body 10. Then, at step 611, it is determined whether the release switch 16 is turned ON. If the turn-ON of the release switch 16 is not carried out, control returns to step 610. Namely, the routine including steps 610 and 611 is repeated until the release switch 16 is turned ON.

Steps 610 and 611 provide against a case where the loaded recording medium RM concerned is discharged from the camera body 10 by depressing the ejector button 27 before the turn-ON of the release switch 16 is carried out for some reason. For example, in the case where a developed recording medium RM is mistaken for a blank recording medium RM, and is erroneously loaded in the camera for a photographing operation, such a developed recording medium RM might be discharged from the camera body 10 due to the message of the liquid crystal display panel 22 which announces that the camera is set in the image-reading mode.

Accordingly, during the repetition of the routine including steps 610 and 611, if the loaded recording medium RM is discharged from the camera body 10 by the depression of the ejector button 27, control returns from step 610 to step 601. Then, the camera stands ready for a further loading of the recording medium RM.

Of course, during the repetition of the routine including steps 610 and 611, if the release switch 16 is turned ON, control proceeds from step 611 to 612, in which the image-reading operation is executed. Note, the image-reading operation will be explained in detail with reference to FIGS. 10 and 11. After the image-reading operation is completed, control returns to step 601.

The sub-routine executed in step 602 of the flow chart shown in FIG. 6, i.e., the sub-routine for determining whether the loaded recording medium RM has been recorded on is now explained with reference to the flow chart shown in FIG. 7.

At step 701, the transparency sensor 88 is energized by the transparency sensor drive circuit 90. Accordingly, a light beam is emitted form the light emitting device of the transparency sensor 88, and is then transmitted through the liquid crystal display 80. The transmitted light beam is incident to the light-reflecting element 86, and is then reflected thereby. The reflected light beam is again transmitted through the liquid crystal display 80, and is then received by the light receiving device of the transparency sensor 88. Thus, the light receiving device of the transparency sensor 88 produces an electrical signal carrying the transparency information of the liquid crystal display 80 corresponding to the dark zone formed by the light-blocking element 84.

At step 702, the produced electrical signal is received as transparency data "MP" by the system control circuit 28 through the transparency sensor drive circuit 90, and the received data "MP" is temporarily stored in the RAM of the system control circuit 28. Then, at step 703, the transparency sensor 88 is deenergized.

At step 704, the following calculation is executed:

$$\Delta P \leftarrow MP - RP$$

Namely, a difference ΔP between the transparency data "MP" and reference data "RP" is calculated. Note, the reference data "RP" is stored in the ROM of the system control circuit 28, and corresponds to the minimum level "ML" of the characteristic curve B shown in the graph of FIG. 4 is calculated.

At step 705, it is determined whether the difference ΔP falls in a permissible range defined by "−δ" and "+δ". If the electro-developing recording medium concerned has not been recorded on, the difference ΔP must be approximately equal to "0"., i.e., the difference ΔP must fall in the permissible range defined by "−δ" and "+δ". On the other hand, if the electro-developing recording medium concerned has been recorded on, the difference ΔP must be a given value corresponding to the level "EL" of the characteristic curve B shown in the graph of FIG. 4.

Accordingly, at step 705, if the difference ΔP falls within the permissible range defined by "−δ" and "+δ", i.e., if the loaded recording medium RM has been not recorded on, control proceeds from step 705 to step 706, in which flag F2 is set to "1". On the other hand, at step 705, if the difference ΔP is out of the permissible range defined by "−δ" and "+δ" i.e., if the loaded recording medium RM has been already recorded on, control proceeds from step 705 to step 707, in which flag F2 is set to "0".

Figure 8:
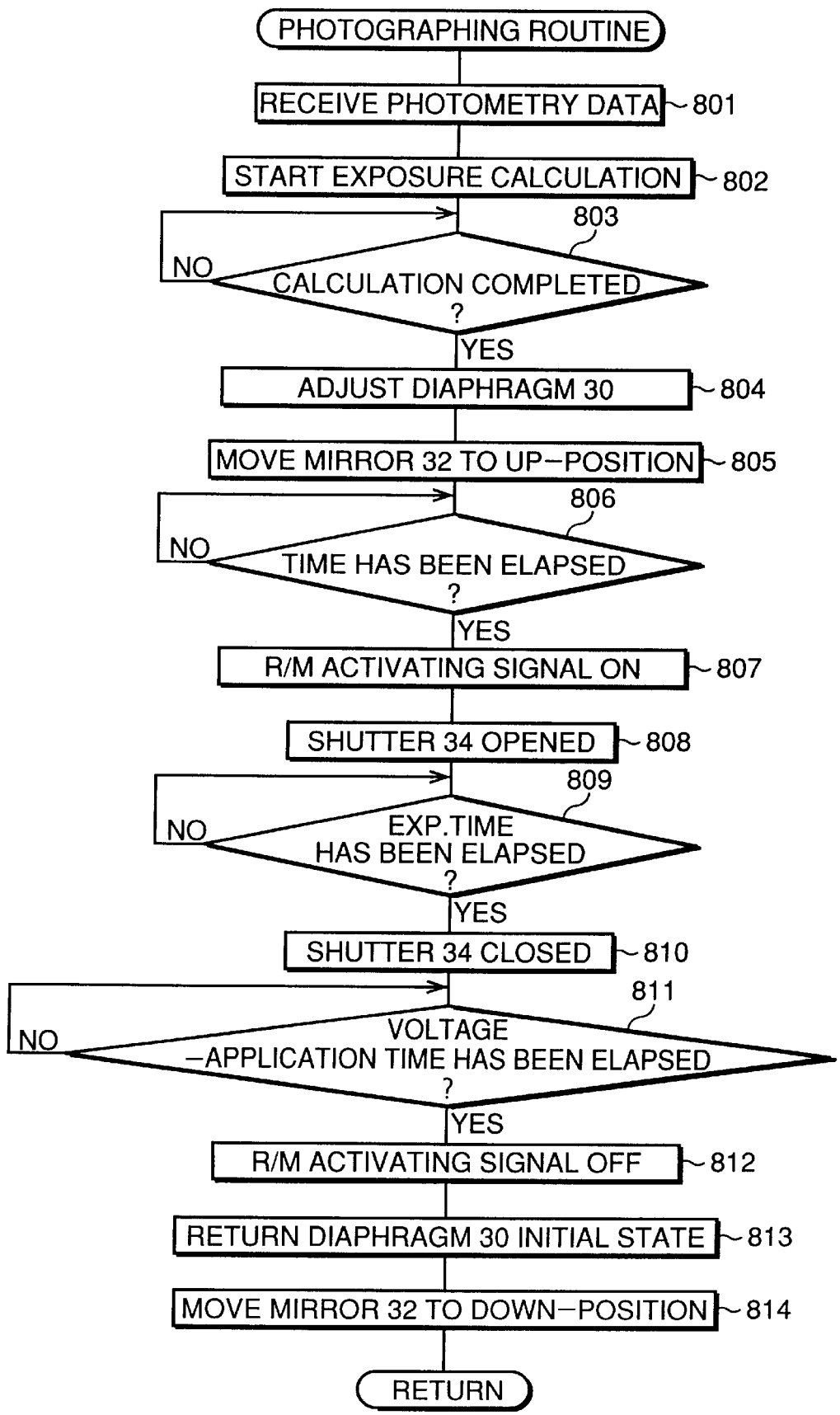
FIG. 8 is a flow chart showing a photographing routine executed by the electro-developing type camera according to the present invention.
Figure 9:
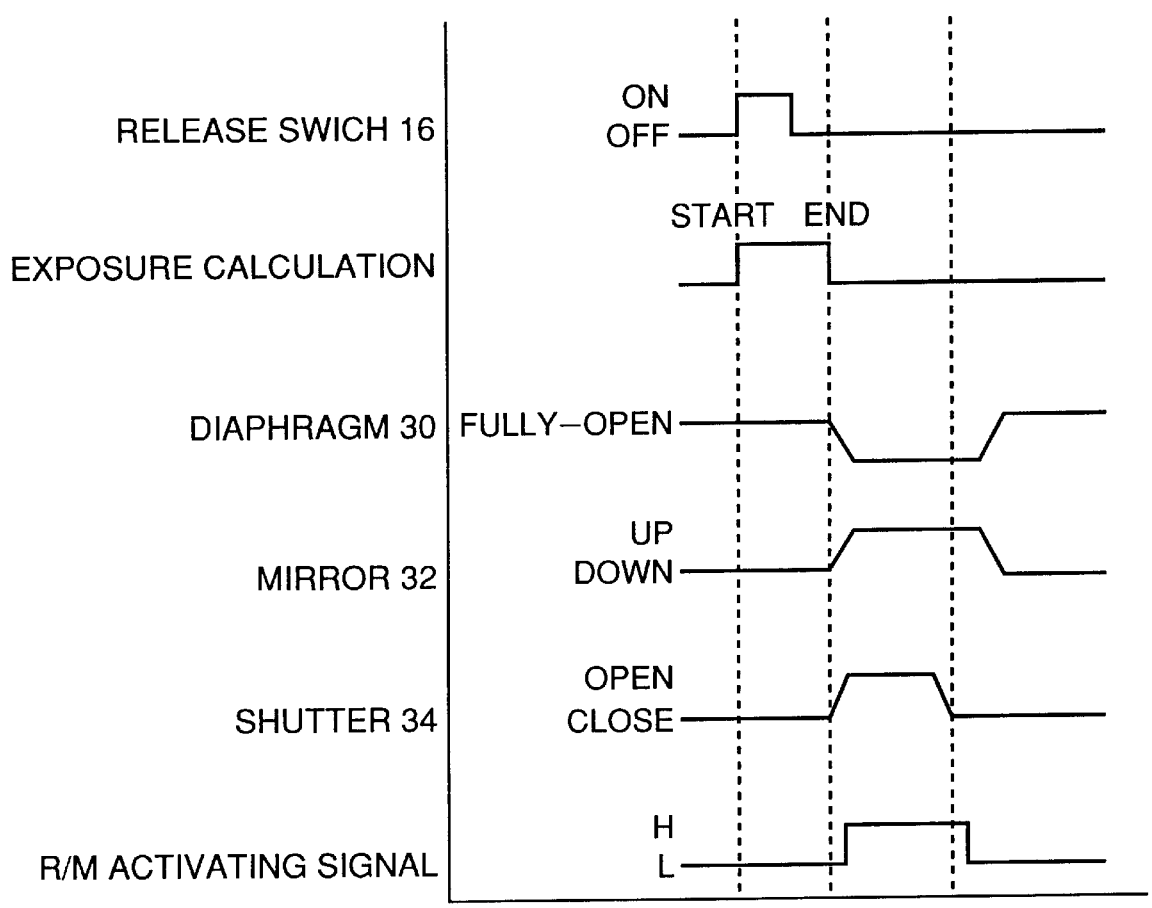
FIG. 9 is a timing chart for explaining the photographing routine of FIG. 8.

FIG. 8 shows a flow chart for explaining the photographing routine executed in step 607 of the flow chart of FIG. 6, and FIG. 9 shows a timing chart for explaining this photographing routine.

With reference to these drawings, the photographing operation will be now explained below.

The execution of the photographing routine is started by turning the release switch (RS) 16 ON during the repetition of the routine including steps 605 and 606 in the flow chart of FIG. 6. Namely, when the release switch 16 has been turned ON, a command pulse for the execution of the photographing routine is produced as shown in the timing chart of FIG. 9, and is inputted to the system control circuit 28.

At step 801, an output signal of the photometry sensor 18, i.e., a photometry value, is sensed and received by the system control circuit 28. Then, at step 802, an exposure calculation is started based on the received photometry value (see FIG. 9).

At step 803, it is determined whether the exposure calculation is completed. When the completion of the exposure calculation has been confirmed (see FIG. 9), control proceeds from step 803 to step 804, in which the size of the aperture or diaphragm 30 is adjusted in accordance with the calculated result (see FIG. 9). Note, since the diaphragm 30 initially has a fully-opened size, the adjustment of the diaphragm 30 is performed such that the fully-opened size is made small as shown in the timing chart of FIG. 9.

At step 805, the quick return mirror 32 is moved from the down-position (solid lines) to the up-position (broken lines), as shown in the timing chart of FIG. 9, by operating the mirror drive circuit 40 under control of the exposure control circuit 44.

At step 806, it is determined whether a given period of time has elapsed. This period of time is a duration necessary for the adjustment of the diaphragm 30 and the movement of the quick return mirror 32 the down-position to the up-position.

When the given period of time has elapsed, i.e., when the adjustment of the diaphragm 30 and the movement of the quick return mirror 32 the down-position to the up-position have been completed, control proceeds from step 806 to step 807, in which a recording medium activating signal outputted from the recording medium drive circuit 46 to the electro-developing recording medium RM is turned ON. Namely, the recording medium activating signal is changed from the low level to the high level, as shown in the timing chart of FIG. 9, so that the activating voltage is applied between the electrostatic information recording medium 78 and the electric charge keeping medium or liquid crystal display 80.

At step 808, the shutter 34 is opened by operating the shutter drive circuit 42 under the control of the exposure control circuit 44 (see FIG. 9), so that an optical image is focussed and formed on the light receiving surface of the electro-developing recording medium RM by the photographing optical system 12. Then, at step 809, it is determined whether a proper time of exposure obtained on the basis of the calculated result has elapsed.

When the proper time of exposure has elapsed, control proceeds from step 809 to step 810, in which the shutter 43 is closed (see FIG. 9). Then, at step 811, it is determined whether a proper time of application of the voltage to the electro-developing recording medium RM has elapsed.

When the proper time of application of the voltage to the electro-developing recording medium RM has elapsed, control proceeds from step 811 to step 812, in which the recording medium activating signal outputted from the drive circuit 46 to the recording medium RM is turned OFF. Namely, the recording medium activation signal is changed from the high level to the low level, as shown in the timing chart of FIG. 9.

At step 813, the aperture of the diaphragm 30 is returned to the fully-open size, and the quick return mirror 32 is returned from the up-position to the down-position (step 814), as shown in the timing chart of FIG. 9.

Thus, the photographing routine is finished, and the optical image obtained by the photographing optical system 12 is developed in the electric charge keeping medium or liquid crystal display 80 of the electro-developing recording medium RM. Namely, the loaded recording medium RM has been recorded on.

As is apparent from the descriptions of the flow chart of FIG. 6, after the photographing routine is finished, control returns to step 608 thereof.

Figure 10:
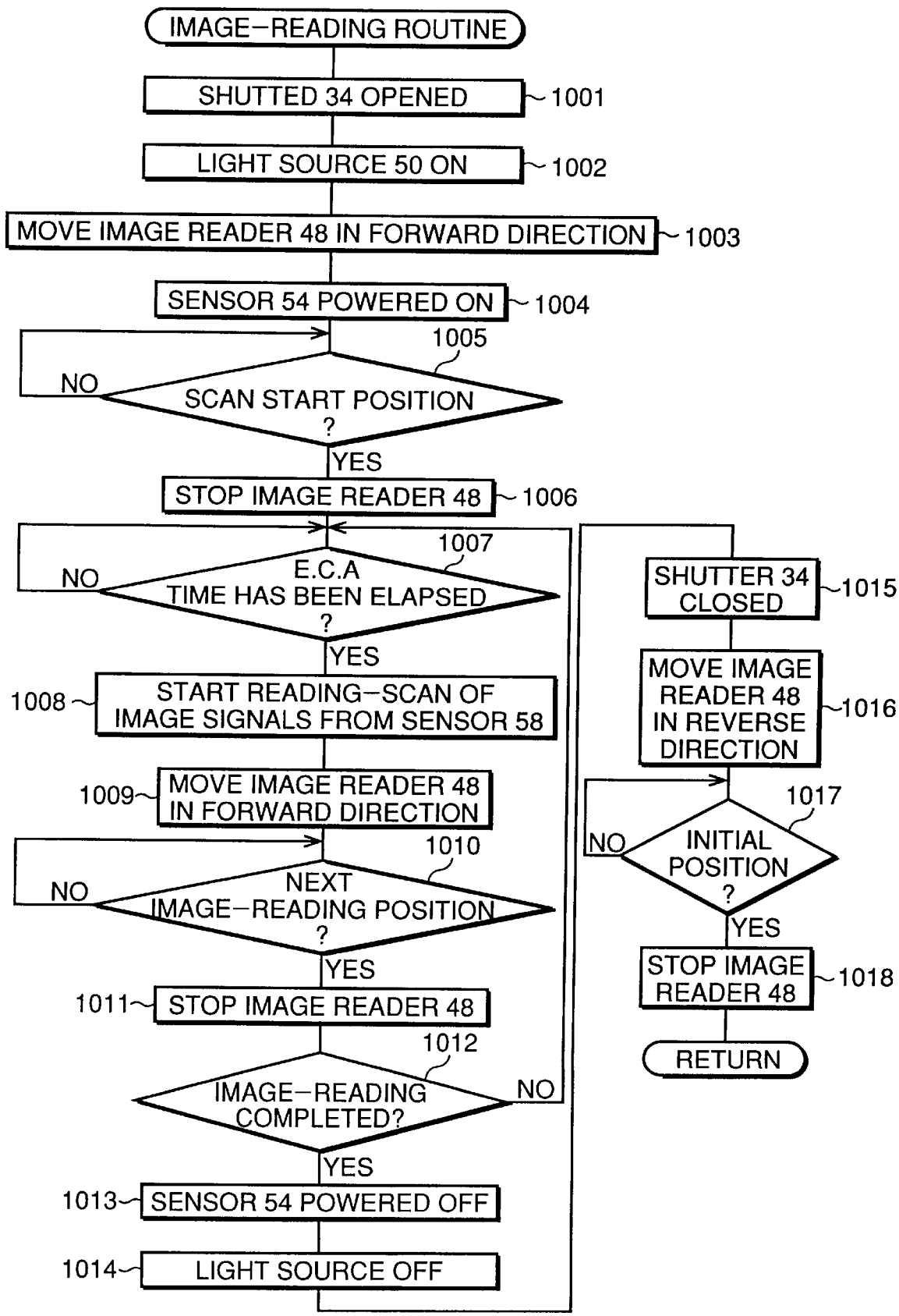
FIG. 10 is a flow chart showing an image-reading routine executed by the electro-developing type camera according to the present invention.
Figure 11:
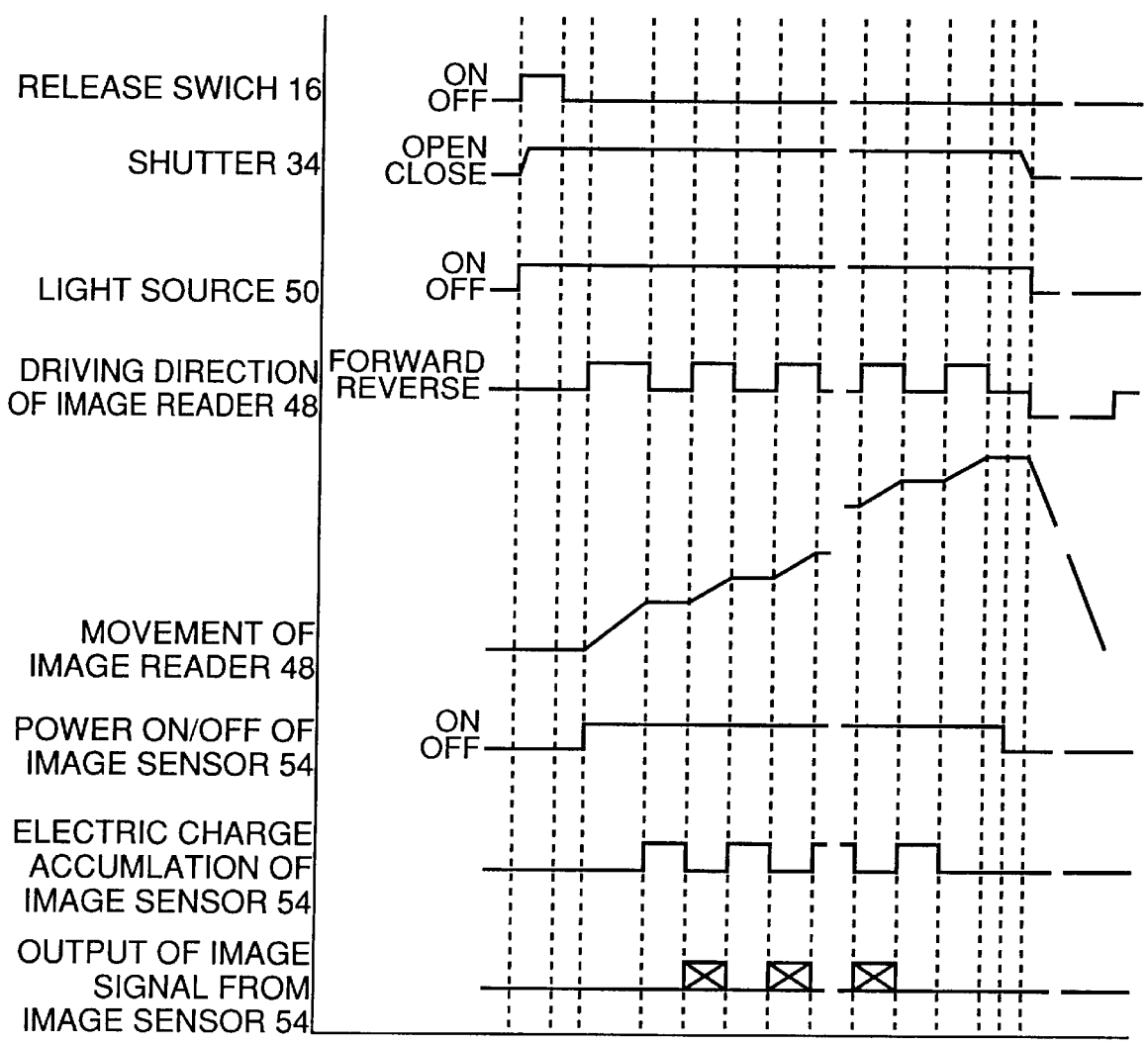
FIG. 11 is a timing chart for explaining the image-reading routine of FIG. 10.

FIG. 10 shows a flow chart for explaining the image-reading routine executed in step 612 of the flow chart of FIG. 6, and FIG. 11 shows a timing chart for explaining this image-reading routine.

With reference to these drawings, the image-reading operation will be now explained below.

The execution of the image-reading routine is started by turning the release switch (RS) 16 ON during the repetition of the routine, including steps 610 and 611, in the flow chart of FIG. 6. Namely, when the release switch 16 has been turned ON, a command pulse for the execution of the image-reading routine is produced, as shown in the timing chart of FIG. 11, and is inputted to the system control circuit 28.

At step 1001, the shutter 34 is opened by the shutter drive circuit 42, and, at step 1002, the light source 50 of the image reader 48 is turned ON by the light source drive circuit 56 (see FIG. 11). Then, control proceeds to step 1003, in which a drive motor (not shown) of the image reader 48 is driven forward by the scanner drive circuit 58, such that the image reader 48 is moved from the lower position (shown by the solid lines in FIG. 2) toward the scan start position (see FIG. 11). Successively, at step 1004, the line image-sensor 54 is powered ON by the line sensor drive circuit 60, as shown in the timing chart of FIG. 11.

At step 1005, it is determined whether the line image-sensor 54 has reached the scan start position. When the arrival of the image reader 54 at the scan start position has been confirmed, control proceeds from step 1005 to step 1006, in which the image reader 48 is once stopped at the scan start position. Thus, the light rays emitted from the liner light source 50 and passing through the developed image of the recording medium RM are focussed on the liner light receiving surface of the line image-sensor 54 by the scanner optical system 52, and electric charge accumulation in the line image-sensor 54 is started (see FIG. 11).

Note, the stoppage of the image reader 48 at the scan start position may be controlled by counting a number of drive pulses outputted from the scanner drive circuit 60 to the drive motor of the image reader 48.

At step 1007, it is determined whether a proper time of electric charge accumulation in the line image-sensor 54 has elapsed (see FIG. 11). When the proper time of electric charge accumulation has elapsed, i.e., when the electric charge accumulation in the line image-sensor 54 has been completed, control proceeds from step 1007 to step 1008, in which a reading-scan of image pixel signals from the line image sensor 54 is started by the line sensor drive circuit 60 (see FIG. 11).

At step 1009, the drive motor (not shown) of the image reader 48 is again driven forward by the scanner drive circuit 58 such that the image reader 48 is moved upward from the scan start position toward a next image-reading position, as shown in the timing chart of FIG. 11.. Then, at step 1010, it is determined whether the image reader 48 has reached the next image-reading position.

When the arrival of the image reader 48 at the next image-reading position has been confirmed, control proceeds from step 1010 to step 1011, in which the image reader 48 is stopped at the next image-reading position (see FIG. 11). Note, the stoppage of the image reader 48 at the next image-reading position also may be controlled by counting a number of drive pulses outputted from the scanner drive circuit 60 to the drive motor of the image reader 48.

At step 1012, it is determined whether the developed image of the electro-developing recording medium RM has been completely read. If the reading of the developed image from the recording medium RM is not completed, control returns from step 1012 to step 1007. Namely, the intermittent movement or scanning-stepped movement of the image reader 48 is repeated until the completion of the reading of the developed image from the recording medium RM.

For example, when the developed image is completely read by the scanning-steps 20,000 times, the routine including steps 1007 to 1012 is repeated 20,000 times, and the read image is reproduced by 20,000 horizontal scanning lines.

As is apparent from the timing chart of FIG. 11, the reading-scan of the image pixel signals from the line image-sensor 54 is carried out during a movement of the image reader 48 between the two adjacent scanning steps or two adjacent image-reading positions. As mentioned hereinbefore, the image pixel signals read-out from the line image-sensor 54 are successively amplified by the amplifier 62, and are converted into digital pixel signals by the A/D converter 64. Then, the digital pixel signals are processed by the image processing circuit 66, and are temporarily stored in the memory 68.

At step 1012, when it has been confirmed that the reading of the developed image from the recording medium RM is completed, control proceeds to step 1013, in which the sensor 54 is powered OFF (see FIG. 11). Then, at step 1014, the light source 50 is turned OFF, and, at step 1015, the shutter 34 is closed (see FIG. 11).

At step 1016, the drive motor (not shown) of the image reader 48 is reversably driven by the scanner drive circuit 58 such that the image reader 48 is moved downward to the lower (or initial) position, as shown in the timing chart of FIG. 11. Then, at step 1017, it is determined whether the image reader 48 has reached the initial position.

When the arrival of the image reader 48 at the initial position has been confirmed, control proceeds from step 1017 to step 1018, in which the image reader 48 is stopped at the initial position. The stoppage of the image reader 48 at the initial position may be controlled by detecting a part of the carriage member 55 with, for example, a photo-interrupter type sensor (not shown). Thus, the image-reading operation is finished.

As is apparent from the descriptions of the flow chart of FIG. 6, after the image-reading routine is finished, control returns to step 601 thereof.

Figure 12:
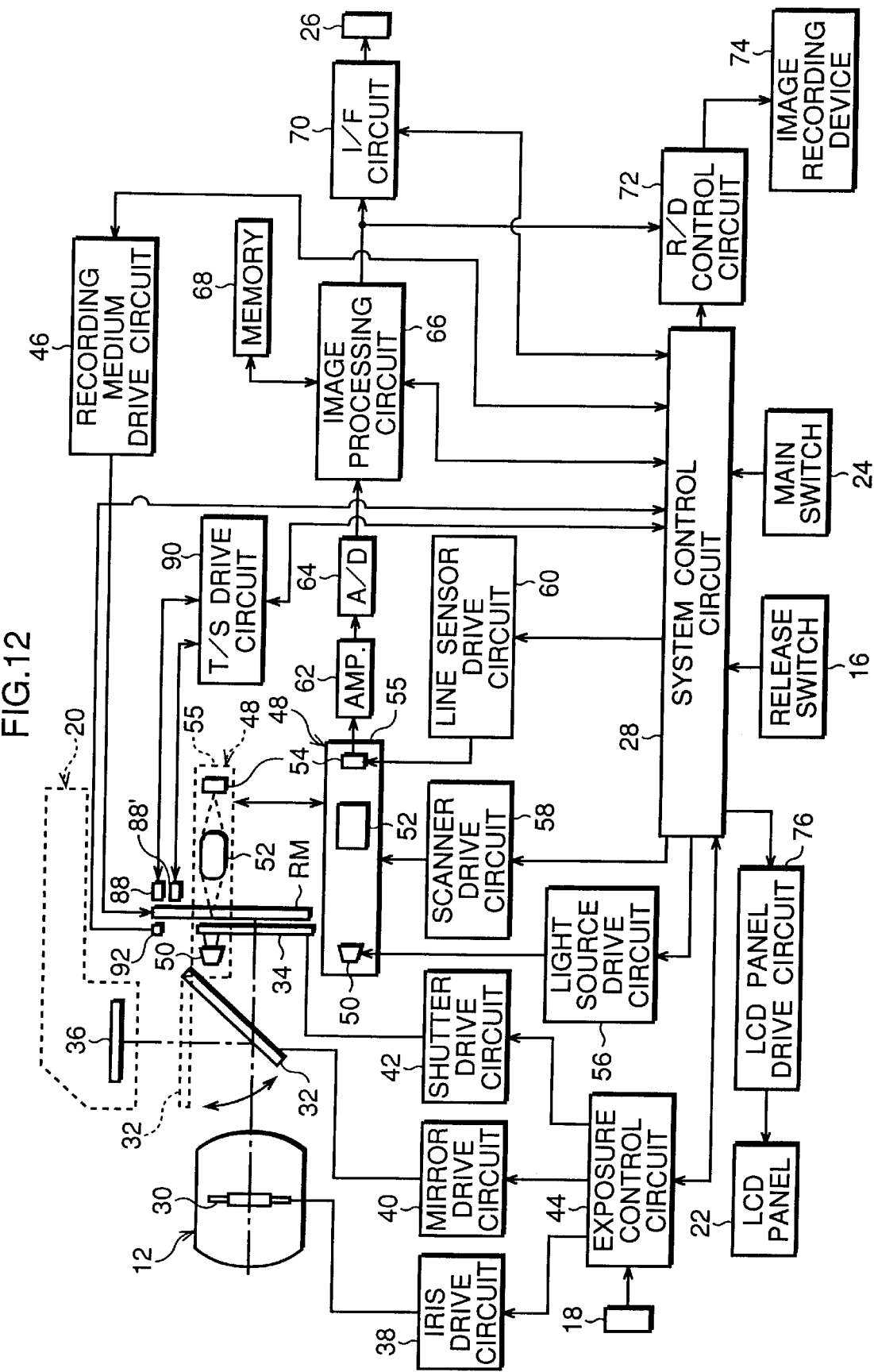
FIG. 12 is a block diagram of the second embodiment of the electro-developing type camera according to the present invention.
Figure 13:
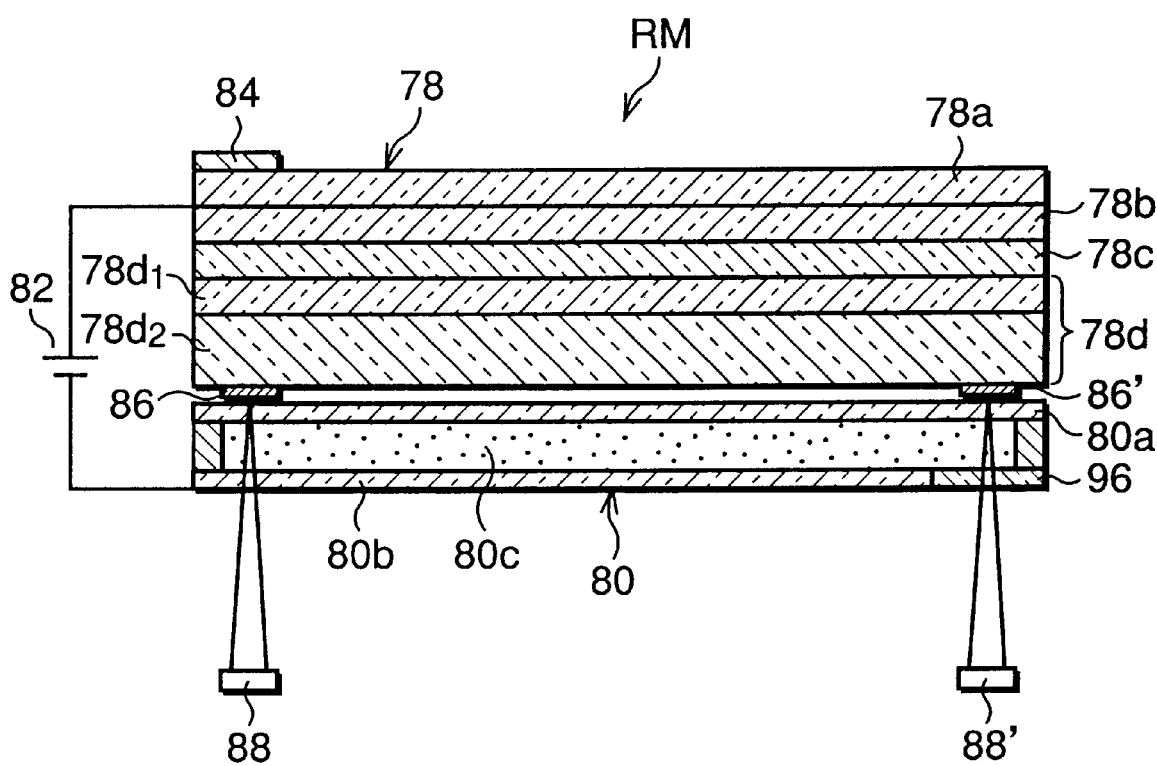
FIG. 13 is a cross sectional view showing a structure of an electro-developing recording medium used in the second embodiment of the electro-developing type camera according to the present invention.

FIG. 12 shows a block diagram of a second embodiment of the electro-developing type camera according to the present invention. The same features used in FIG. 2 are indicated by the same references. Also, FIG. 13 shows a structure of an electro-developing recording medium RM used in the second embodiment of the present invention. In this drawing, the same references used in FIG. 3 represent the same elements.

As shown FIGS. 12 and 13, according to the second embodiment of the present invention, the camera is provided with an additional transparency sensor 88' incorporated in the camera body 10, and the additional transparency sensor 88' is connected to the system control circuit 28 through the transparency sensor drive circuit 90. An arrangement of the additional transparency sensor 88' is identical with that of the transparency sensor 88, and thus the same descriptions referring to the transparency sensor 88 is true for the additional transparency sensor 88'.

As shown in FIG. 13, a part of a margin area of the liquid crystal electrode layer 80b is replaced with a transparent insulator material 96 such as a transparent glass material. Accordingly, although the voltage is applied to the electro-developing recording medium RM, no electric field acts on a part of a margin area of the liquid crystal 80c defined by the transparent insulator material 96, and thus that part of the margin area of the liquid crystal 80c always has a constant transparency, regardless of the application of voltage to the electro-developing recording medium RM.

Also, as shown in FIG. 13, a light-reflecting element 86' is adhered to the surface of the photoconducting layer 78d so as to be aligned with the transparent insulator material 96, and the additional transparency sensor 88' is arranged so as to be aligned with the light-reflecting element 86', when the electro-developing recording medium RM is loaded into the camera body 10. Accordingly, the additional transparency sensor 88' detects the constant transparency of the part of the margin area of the liquid crystal display 80c enclosed by the transparent insulator material 96.

When no voltage is applied to the electro-developing recording medium RM, a transparency of the liquid crystal display 80 thereof must have a minimum level as indicated by reference "ML" in the graph of FIG. 4. Nevertheless, the minimum level of transparency varies among the individual products of the electro-developing recording medium RM. According to the second embodiment of the present invention, in each of the products of the electro-developing recording medium RM, the minimum level of transparency can be detected by the additional transparency sensor 88'.

Figure 14:
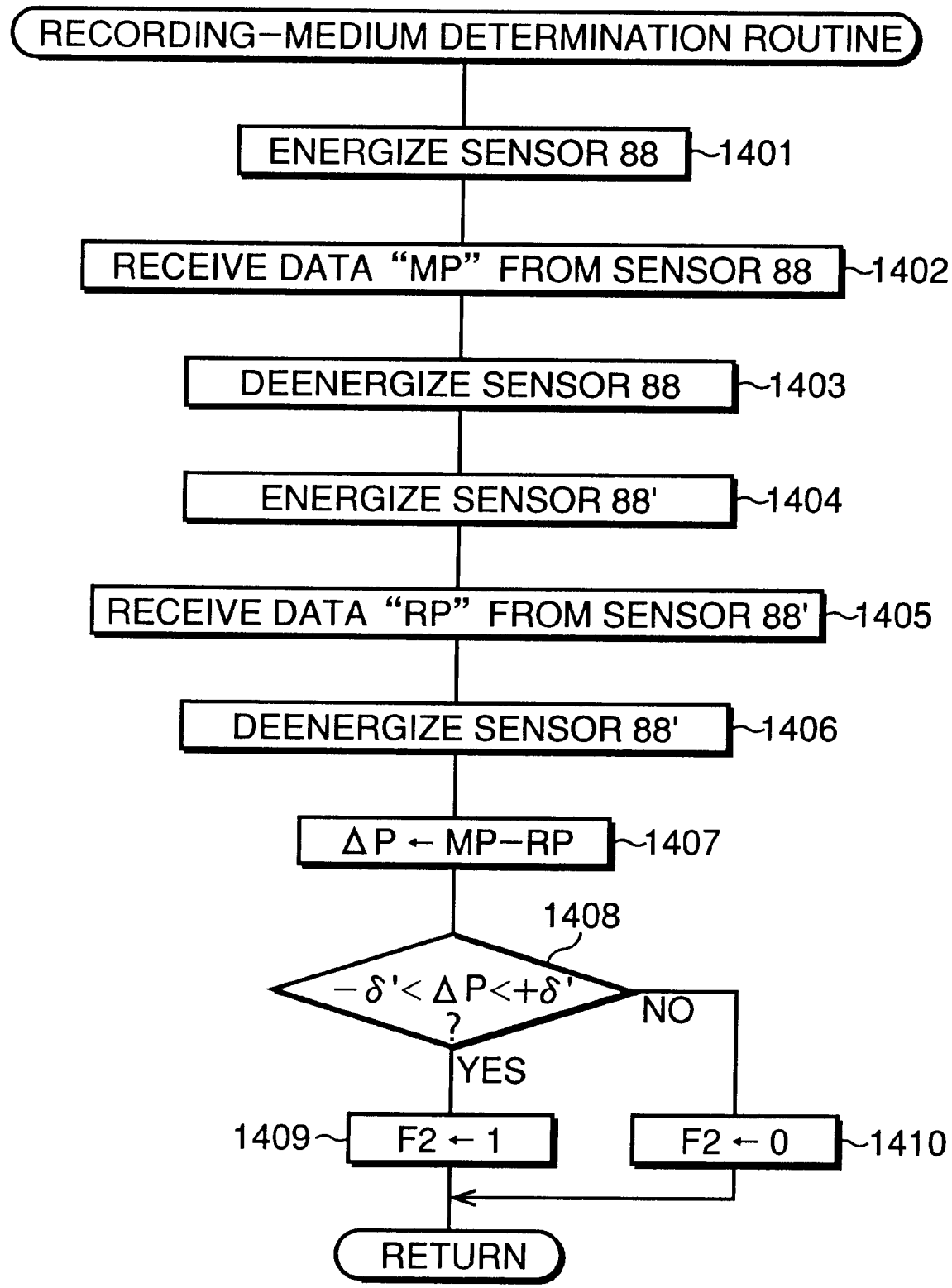
FIG. 14 is a flow chart showing a recording-medium determination routine for determining whether the electro-developing recording medium shown in FIG. 13 has been recorded on or not when being loaded in the electro-developing type camera according to the present invention.

FIG. 14 shows a flow chart for explaining a routine for determining whether a loaded electro-developing recording medium has been recorded on in the second embodiment of the present invention. Similar to the routine of FIG. 7, this routine is executed whenever the main switch 24 is turned ON. Also, while the main switch is turned ON, the routine is executed whenever an electro-developing recording medium is loaded into the camera.

At step 1401, the transparency sensor 88 is energized by the transparency sensor drive circuit 90. Accordingly, a light beam is emitted form the light emitting device of the transparency sensor 88, and is then transmitted through the liquid crystal display 80. The transmitted light beam is incident to the light-reflecting element 86, and is then reflected thereby. The reflected light beam is again transmitted through the liquid crystal display 80, and is then received by the light receiving device of the transparency sensor 88. Thus, the light receiving device of the transparency sensor 88 produces an electrical signal carrying the transparency information of the liquid crystal display 80 corresponding to the dark zone formed by the light-blocking element 84.

At step 1402, the produced electrical signal is received as a dark-zone-transparency data "MP" by the system control circuit 28 through the transparency sensor drive circuit 90, and the received data "MP" is temporarily stored in the RAM of the system control circuit 28. Then, at step 1403, the transparency sensor 88 is deenergized.

At step 1404, the additional transparency sensor 88' is energized by the transparency sensor drive circuit 90. Accordingly, a light beam is emitted form the light emitting device of the additional transparency sensor 88', and is then transmitted through the liquid crystal display 80. The transmitted light beam is incident to the light-reflecting element 86', and is then reflected thereby. The reflected light beam is again transmitted through the liquid crystal display 80, and is then received by the light receiving device of the additional transparency sensor 88'. Thus, the light receiving device of the additional transparency sensor 88' produces an electrical signal carrying the transparency information of the liquid crystal display 80 corresponding to the non-electric field zone enclosed by the transparent insulator material 96.

At step 1405, the produced electrical signal is received as reference-transparency data "RP" by the system control circuit 28 through the transparency sensor drive circuit 90, and the received data "RP" is temporarily stored in the RAM of the system control circuit 28. Then, at step 1406, the additional transparency sensor 88' is deenergized.

At step 1407, the following calculation is executed:

$$\Delta P \leftarrow MP - RP$$

Namely, a difference $\Delta P$ between the dark-zone-transparency data "MP" and the reference-transparency data "RP" is calculated.

At step 1408, it is determined whether the difference $\Delta P$ falls in a permissible range defined by "$-\delta'$" and "$+\delta'$". If the electro-developing recording medium concerned has not been recorded on, the difference $\Delta P$ must be approximately equal to "0"., i.e., the difference $\Delta P$ must fall in the permissible range defined by "$-\delta'$" and "$+\delta'$". On the other hand, if the electro-developing recording medium concerned has been recorded on, the difference $\Delta P$ must be a given value corresponding to the level "EL" of the characteristic curve B shown in the graph of FIG. 4.

Accordingly, at step 1408, if the difference $\Delta P$ falls within the permissible range defined by "$-\delta'$" and "$+\delta'$", i.e., if the loaded recording medium RM has been not recorded on, the control proceeds from step 1408 to step 1409, in which flag F2 is set to "1". On the other hand, at step 1408, if the difference $\Delta P$ is out of the permissible range defined by "$-\delta'$" and "$+\delta'$", i.e., if the loaded recording medium RM has been already recorded on, the control proceeds from step 1408 to step 1410, in which flag F2 is set to "0".

Of course, in the operation of the second embodiment of the camera according the present invention, the routine of FIG. 14 is executed at step 602 of FIG. 6.

As is apparent from the foregoing, according to the second embodiment of the present invention, in each of the products of the electro-developing recording medium RM, the reference-transparency data or minimum transparency data "RP", having the minimum level as indicated by reference RM in the graph FIG. 4, is detected by the additional transparency sensor 88' and is compared with the dark-zone-transparency data concerned. Accordingly, the permissible range defined by "$-\delta'$" and "$+\delta'$" can be make narrower than the permissible range defined by "$-\delta$" and "$+\delta$" in the first embodiment of the present invention. Namely, the determination obtained by the second embodiment of the present invention is more reliable than that obtained by the first embodiment thereof.

Figure 15:
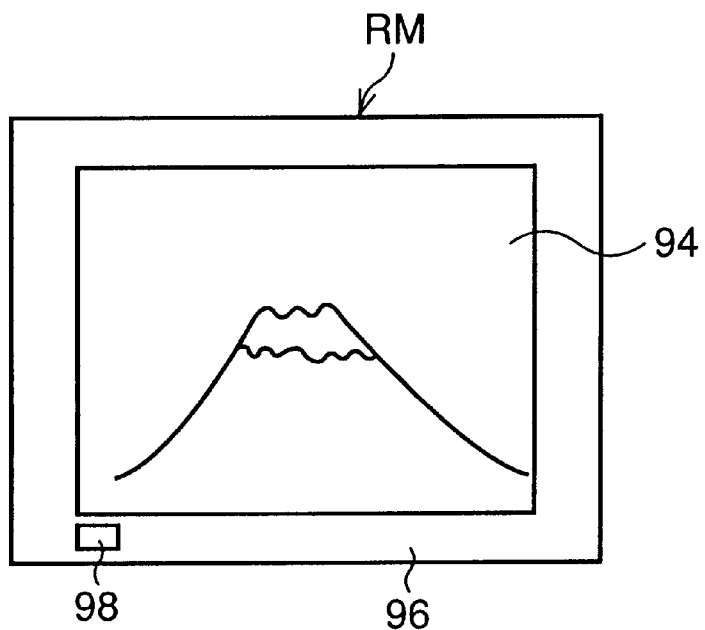
FIG. 15 is a front view of an electro-developing recording medium used in a third embodiment of the electro-developing type camera according to the present invention.
Figure 16:
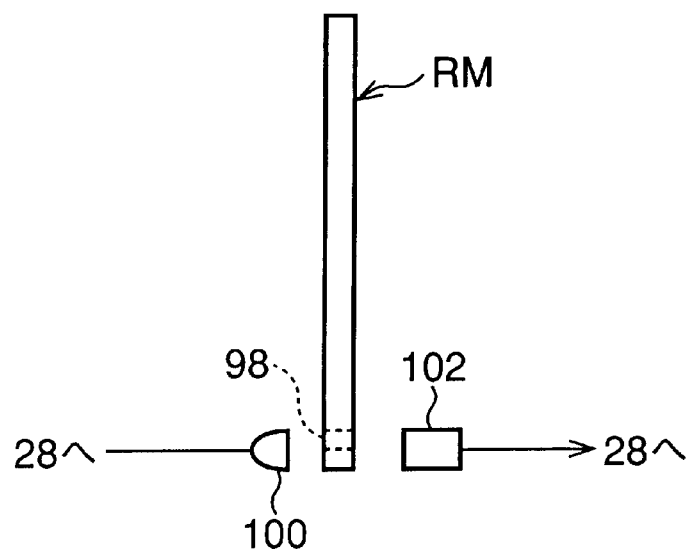
FIG. 16 is a side view of the electro-developing recording medium shown in FIG. 15, with illustrating a light source and an optical sensor forming a part of the third embodiment of the electro-developing type camera according to the present invention.

FIGS. 15 and 16 show an electro-developing recording medium RM used in a third embodiment of the electro-developing type camera according to the present invention. Note, a block diagram of the third embodiment of the present invention is not illustrated because such a block diagram is substantially identical with that of FIG. 2 except that a light source 100 and an optical sensor 102 as shown in FIG. 16 are substituted for the transparency sensor 88.

As shown in FIG. 15, the electro-developing recording medium RM includes an image-recording area 94 for forming an optical image thereon by the photographing optical system 12, and a peripheral margin area 96 surrounding therearound. The recording medium RM is provided with a detective zone 98 located at the peripheral margin area 96 thereof, and the detective zone 98 is formed as a detective through-zone through which light rays can be transmitted.

In the third embodiment, the light source 100 and the optical sensor 102 are aligned with each other, and the detective zone 98 is intervened therebetween when the electro-developing recording medium RM is loaded in the camera boy (10), as shown in FIG. 16. The light source 100 and the optical sensor 102 are connected to the system control circuit 28, and are suitably energized under control of the system control circuit 28.

During a photographing operation of the third embodiment of the present invention, the detective zone 98 is exposed to the light rays emitted from the light source 100. Namely, when the shutter 34 is opened at step 808 of the flowchart shown in FIG. 8, the light source 100 is turned ON, and, when the shutter 34 is closed at step 810 of the flowchart of FIG. 8, the light source 100 is turned OFF. Thus, a transparency of the detective zone 98 must be varied as represented by the characteristic curve A shown in the graph of FIG. 4.

Accordingly, when the electro-developing recording medium RM is not recorded on, the transparency of the detective zone 98 must have a minimum level as indicated by reference "ML" in the graph of FIG. 4. On the other hand, if the electro-developing recording medium RM is already recorded on, the transparency of the detective zone 96 must have a high level, for example, as indicated by reference "EL" in the graph of FIG. 4.

Figure 17:
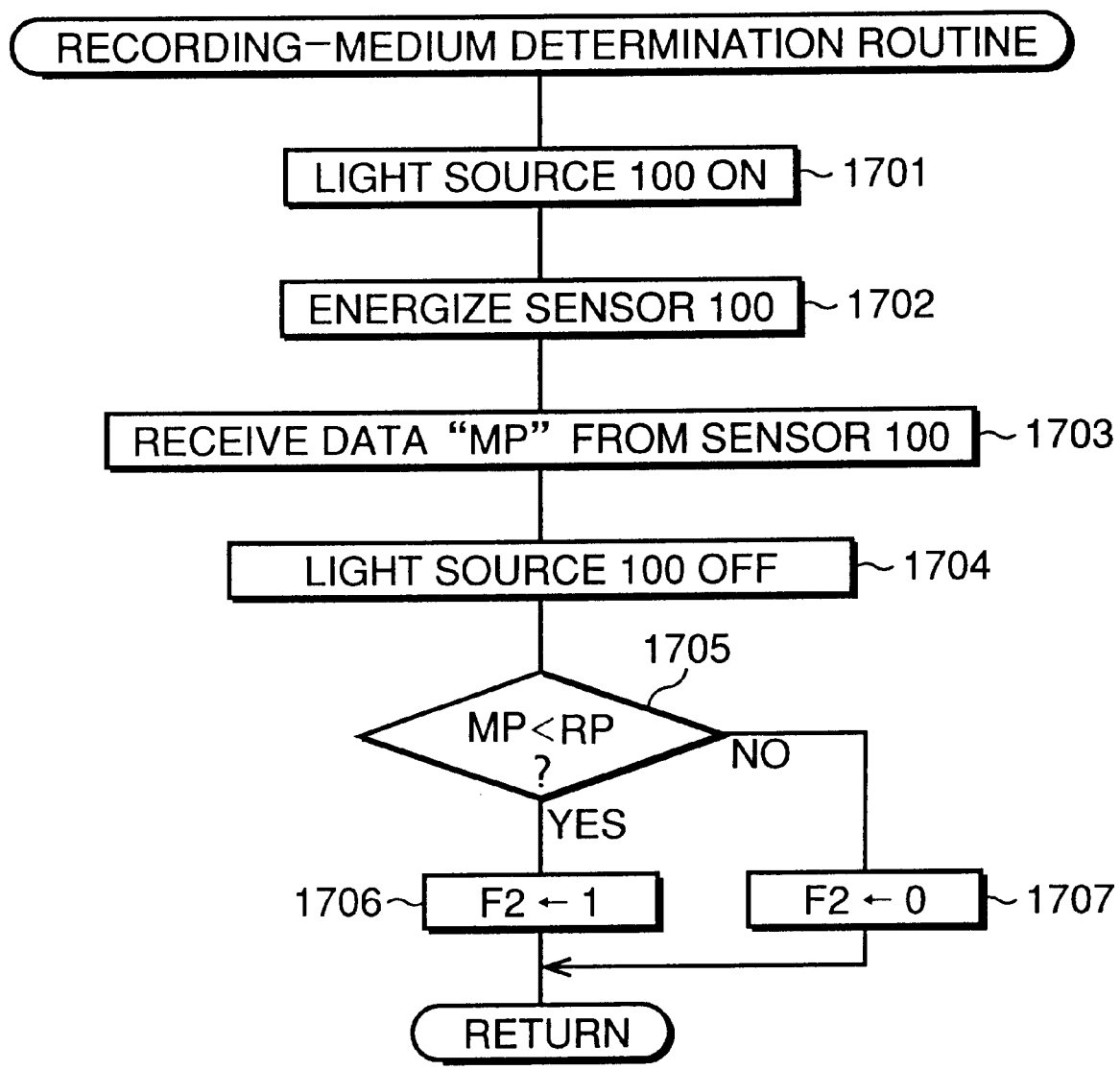
FIG. 17 is a flow chart showing a recording-medium determination routine for determining whether the electro-developing recording medium shown in FIG. 16 has been recorded on or not when being loaded in the electro-developing type camera according to the present invention.

FIG. 17 shows a flow chart for explaining a routine for determining whether the loaded recording medium RM has been recorded on in the third embodiment. Similar to the routine of FIG. 7, this routine is executed whenever the main switch 24 is turned ON. Also, while the main switch is turned ON, the routine is executed whenever an electro-developing recording medium is loaded into the camera.

At step 1701, the light source 100 is turned on by a suitable power source circuit (not shown), and, at step 1702, the optical sensor 102 is energized by an optical sensor drive circuit (not shown). A light beam emitted form the light source 100 is transmitted through the detective zone 98, and is then received by the optical sensor 102. Accordingly, the optical sensor 102 produces an electrical signal carrying the transparency information of the detective zone 98.

At step 1703, the produced electrical signal is received as transparency data "MP" by the system control circuit 28, and the received transparency data "MP" is temporarily stored in the RAM of the system control circuit 28. Then, at step 1704, the optical sensor 102 is deenergized.

At step 1705, the transparency data "MP" is compared with threshold data "RP", i.e., it is determined whether or not the transparency data "MP" is smaller than the threshold data "RP". Note, the threshold data "RP" is stored in the ROM of the system control circuit 28, and corresponds to a level "RL" of the characteristic curve A shown in the graph of FIG. 4.

If the loaded recording medium RM is not recorded on, the transparency data "MP" of the detective zone 94 must have a minimum level corresponding to the minimum level "ML" of the characteristic curve A shown in the graph of FIG. 4. In this case, the transparency data "MP" must be considerably smaller than the threshold data "RP" corresponding to the level "RL" shown in FIG. 4.

On the other hand, if the loaded recording medium RM is recorded on, the transparency data "MP" of the detective zone 94 must have a considerably higher level than the threshold data "RP" corresponding to the level "RL" shown in FIG. 4.

Accordingly, at step 1705, when the transparency data "MP" is smaller than the threshold data "RP", i.e., when the loaded recording medium RM has been not recorded on, the control proceeds from step 1705 to step 1706, in which the flag F2 is made "1". On the other hand, at step 1705, when the transparency data "MP" is larger than the threshold data "RP", i.e., when the loaded recording medium RM has been recorded on, the control proceeds from step 1705 to step 1707, in which the flag F2 is made "0".

Of course, in the operation of the third embodiment of the camera according the present invention, the routine of FIG. 17 is executed at the step 602 of FIG. 6.

In the third embodiment as mentioned above, the image reader 48 may be substituted for the light source 100 and the optical sensor 102.

In particular, when the transparency of the detective zone 98 is measured, the image reader 48 is moved to a position at which the detective zone 98 is intervened between the light source (50) and the scanner optical system 52, and the light rays emitted from the light source 50 and passing through the detective zone 98 are focussed on the liner light receiving surface of the line image-sensor 54. The output signals read-out from the line image-sensor 54 are summed, and are evaluated as the transparency data "MP" of the detective zone 98. Note, preferably, the image reader 48 is arranged at the initial position thereof such that the detective zone 98 is intervened between the light source 50 and the scanner optical system 52 he recording medium RM is loaded in the camera body 10.

In the present invention, a user may be obligated to adhere a detective mark to a predetermined location of the electro-developing recording medium RM whenever being recorded on. In this case, by detecting the detective mark with a suitable sensor, it is possible to determine whether the recording medium RM concerned has been recorded on.

Further, the electro-developing recording medium RM may be provided with a mechanically-removable detective element for determining whether it has been recorded on or not, and a user is obligated to remove the detective element from the recording medium RM whenever being recorded on. In this case, by detecting the removal of the detective element with a suitable sensor, it is possible to determine whether the recording medium RM concerned has been recorded on or not.

As is apparent from the foregoing, according to the present invention, since not only can the release switch be used for the photographing operation, but also it can serve as an image-reading start switch in accordance with the result of the determination of an electro-developing recording medium RM, the electro-developing type camera according to the present invention does not necessitate such an image-reading start switch. Also, although an developed recording medium is loaded in the camera, the photographing operation cannot be carried out, and thus a double exposure to the developed recording medium can be surely prevented.

Finally, it will be understood by those skilled in the art that the foregoing description is of preferred embodiments of the disclosed electro-developing type camera, and that various changes and modifications may be made to the present invention without departing from the spirit and scope thereof.

The present disclosure relates to subject matter contained in Japanese Patent Application No. 7-290372 (filed on Oct. 12, 1995), which is expressly incorporated herein, by reference, in its entirety.

I claim:

1. An electro-developing type camera using an electro-developing recording medium, comprising:

a determiner that determines whether said electro-developing recording medium has been recorded on when being loaded in the camera; and a selector that selects one of a photographing mode and an image-reading mode as an operation mode of the camera, a photographing operation being executed in said photographing mode to record and develop an optical image in said electro-developing recording medium, an image-reading operation being executed in said image-reading mode to read said developed optical image of said electro-developing recording medium, wherein said photographing mode is selected by said selector when said determiner determines that said electro-developing recording medium has not been recorded on, and said image-reading mode is selected by said selector when said determiner determines that said electro-developing recording medium has been recorded on.

2. An electro-developing type camera as set forth in claim 1, further comprising a message displayer that displays a message indicating said photographing mode when said determiner determines that said electro-developing recording medium has not been recorded on, and for displaying a message indicating said image-reading mode when said determiner determines that said electro-developing recording medium has been recorded on.

3. An electro-developing type camera as set forth in claim 2, wherein said message displayer comprises a liquid crystal displayer provided on a camera body of the camera.

4. An electro-developing type camera as set forth in claim 1, wherein said electro-developing recording medium includes an electrostatic information recording medium and an electric charge keeping medium, said determiner comprising:

a transparency sensor that detects dark-zone-transparency data at a portion of said electric charge keeping medium corresponding to a dark zone defined on a light receiving surface of said electrostatic information recording medium; and a comparator that compares said dark-zone-transparency data with reference-transparency data, it being determined that said electro-developing recording medium has not been recorded on when said comparator determines that said dark-zone-transparency data is substantially equal to said reference-transparency data, it being determined that said electro-developing recording medium has been recorded on when said comparator determines that said dark-zone-transparency data is out of a predetermined range of said reference-transparency data.

5. An electro-developing type camera as set forth in claim 4, wherein said comparator comprises a calculator that calculates comparison data between said dark-zone-transparency data and said reference-transparency data, said comparator determining whether said comparison data falls within a given permissible range.

6. An electro-developing type camera as set forth in claim 1, wherein said electro-developing recording medium includes an electrostatic information recording medium and an electric charge keeping medium, said determiner comprising:

a transparency sensor that detects dark-zone-transparency data at a portion of said electric charge keeping medium corresponding to a dark zone defined on a light receiving surface of said electrostatic information recording medium; and an electronic control circuit that includes a memory that stores a comparator program for comparing said dark-zone-transparency data with reference-transparency data, it being determined that said electro-developing recording medium has not been recorded on when said comparator determines that said dark-zone-transparency data is substantially equal to said reference-transparency data, and it being determined that said electro-developing recording medium has been recorded on when said comparator program determines that said dark-zone-transparency data is out of a predetermined range of said reference-transparency data.

7. An electro-developing type camera as set forth in claim 6, wherein said comparator program comprises a calculator program that calculates comparison data between said dark-zone-transparency data and said reference-transparency data, said comparator program determining whether said comparison data falls within a given permissible range.

8. An electro-developing type camera as set forth in claim 1, wherein said electro-developing recording medium includes an electrostatic information recording medium and an electric charge keeping medium, said determiner comprising:

a transparency sensor that detects dark-zone-transparency data at a portion of said electric charge keeping medium corresponding to a dark zone defined on a light receiving surface of said electrostatic information recording medium; and a second transparency sensor that detects reference-transparency data at a non-electric field portion of said electric charge keeping medium; and a comparator that compares said dark-zone-transparency data with said reference-transparency data, it being determined that said electro-developing recording medium has not been recorded on when said comparator determines that said dark-zone-transparency data is substantially equal to said reference-transparency data, it being determined that said electro-developing recording medium has been recorded on when said comparator program determines that said dark-zone-transparency data is out of a predetermined range of said reference-transparency data.

9. An electro-developing type camera as set forth in claim 8, wherein said comparator comprises a calculator that calculates comparison data between said dark-zone-transparency data and said reference-transparency data, and said comparator determines whether said comparison data falls within a given permissible range.

10. An electro-developing type camera as set forth in claim 1, wherein said electro-developing recording medium includes an electrostatic information recording medium and an electric charge keeping medium, said determiner comprising:

a first transparency sensor that detects dark-zone-transparency data at a portion of said electric charge keeping medium corresponding to a dark zone defined on a light receiving surface of said electrostatic information recording medium;

a second transparency sensor that detects reference-transparency data at a non-electric field portion of said electric charge keeping medium; and an electronic control circuit that includes a memory for storing a comparator program that compares said dark-zone-transparency data with reference-transparency data, it being determined that said electro-developing recording medium has not been recorded on when said comparator determines that said dark-zone-transparency data is substantially equal to said reference-transparency data, and it being determined that said electro-developing recording medium has been recorded on when said comparator program determines that said dark-zone-transparency data is out of a predetermined range of said reference-transparency data.

11. An electro-developing type camera as set forth in claim 10, wherein said comparator program comprises a calculator program that calculates comparison data between said dark-zone-transparency data and said reference-transparency data, and said comparator program determines whether said comparison data falls within a given permissible range.

12. An electro-developing type camera as set forth in claim 1, wherein said determiner comprises:

a transparency sensor that detects transparency data of a detective through-zone defined in said electro-developing recording medium; and a comparator that compares said transparency data with a threshold-transparency data, it being determined that said electro-developing recording medium has not been recorded on when said comparator determines that said transparency data is smaller than said threshold-transparency data, it being determined that said electro-developing recording medium has been recorded on when said comparator determines that said transparency data is larger than said threshold-transparency data.

13. An electro-developing type camera as set forth in claim 12, further comprising a light source that illuminates said detective through-zone, said light source being energized such that said detective through-zone is exposed to light rays emitted from said light source during a photographing operation of the camera.

14. An electro-developing type camera as set forth in claim 13, wherein said light source is further energized to detect said transparency data of said detective through-zone.

15. An electro-developing type camera as set forth in claim 1, wherein said determiner comprises:

a transparency sensor that detects transparency data of a detective through-zone defined in said electro-developing recording medium; and an electronic control circuit that includes a memory that stores a comparator program for comparing the transparency data with threshold-transparency data, it being determined that said electro-developing recording medium has not been recorded on when said comparator determines that said transparency data is smaller than said threshold-transparency data, it being determined that said electro-developing recording medium has been recorded on when said comparator determines that said transparency data is larger than said threshold-transparency data.

16. An electro-developing type camera as set forth in claim 15 further comprising a light source that illuminates said detective through-zone, said light source being energized such that said detective through-zone is exposed to light rays emitted from said light source during a photographing operation of the camera.

17. An electro-developing type camera as set forth in claim 16, wherein said light source is further energized to detect said transparency data of said detective through-zone.

18. An electro-developing type camera utilizing an electro-developing recording medium, said camera comprising:

a determining system that determines whether the electro-developing recording medium has been recorded on; and a selecting system that selects, in response to said determining system determining that the electro-developing recording medium has been recorded on, an image reading mode, an image reading operation being executed in the image reading mode to read a developed optical image of the electro-developing recording medium, and, said selecting system selecting, in response to said determining system determining that the electro-developing recording medium has not been recorded on, a photographing mode, a photographing operation being performed in said photographing mode to record and develop an optical image in the electro-developing recording medium.

19. The electro-developing recording-type camera according to claim 18, said determining system determining whether the electro-developing recording medium has been recorded on in response to an output of a sensing system that senses a transparency of a predetermined area of the electro-developing recording medium.

20. The electro-developing type camera according to claim 19, said determining system comparing an output of said sensor system with a reference transparency value stored in a memory.

21. The electro-developing type camera according to claim 18, said determining system determining that the electro-developing recording medium has been recorded on when a difference between a sensed transparency data and said reference transparency data is greater than a predetermined value.

* * * * *